US012514776B2

(12) United States Patent
Wang

(10) Patent No.: US 12,514,776 B2
(45) Date of Patent: Jan. 6, 2026

(54) MASSAGE ARMCHAIR, AND MASSAGE MECHANISM AND MASSAGE METHOD THEREOF

(71) Applicant: HENGLIN HOME FURNISHINGS CO., LTD., Zhejiang (CN)

(72) Inventor: Jianglin Wang, Huzhou (CN)

(73) Assignee: HENGLIN HOME FURNISHINGS CO., LTD., Zhejiang (CN)

( * ) Notice: Subject to any disclaimer, the term of this patent is extended or adjusted under 35 U.S.C. 154(b) by 1028 days.

(21) Appl. No.: 17/627,684

(22) PCT Filed: Jun. 22, 2020

(86) PCT No.: PCT/CN2020/097416
§ 371 (c)(1),
(2) Date: Jan. 16, 2022

(87) PCT Pub. No.: WO2021/008305
PCT Pub. Date: Jan. 21, 2021

(65) Prior Publication Data

US 2022/0241135 A1 Aug. 4, 2022

(30) Foreign Application Priority Data

Jul. 16, 2019 (CN) ......................... 201910641351.3
Jul. 16, 2019 (CN) ......................... 201910642101.1
Jul. 16, 2019 (CN) ......................... 201910642114.9

(51) Int. Cl.
*A61H 7/00* (2006.01)
*A61H 15/00* (2006.01)

(52) U.S. Cl.
CPC ............. *A61H 7/007* (2013.01); *A61H 7/004* (2013.01); *A61H 15/00* (2013.01);
(Continued)

(58) Field of Classification Search
CPC .............. A61H 7/007; A61H 2007/009; A61H 15/0078; A61H 7/004; A61H 15/00;
(Continued)

(56) References Cited

U.S. PATENT DOCUMENTS

2008/0125683 A1* 5/2008 Chen .................. A61H 15/0078 601/134
2008/0312569 A1* 12/2008 Chen ...................... A61H 7/007 601/134
2017/0258669 A1* 9/2017 Ishikawa ............. A61H 23/006

FOREIGN PATENT DOCUMENTS

CN 100382775 4/2008
CN 202942378 5/2013
CN 109259995 1/2019
CN 208448086 2/2019
(Continued)

OTHER PUBLICATIONS

English translation of Jiang et al. CN 102151214 (Year: 2011).*
(Continued)

*Primary Examiner* — Justine R Yu
*Assistant Examiner* — Christopher E Miller
(74) *Attorney, Agent, or Firm* — JCIPRNET

(57) ABSTRACT

A massage mechanism includes a connecting seat, a supporting seat assembly, upper massage arms, lower massage arms, a kneading shaft and a first driving assembly. The first driving assembly is used for driving the kneading shaft to rotate, such that a connecting member and a connecting shaft are driven to perform a reciprocating motion on each supporting seat assembly, and upper massage rolling wheels and lower massage rolling wheels are close to each other or away from each other, so as to achieve a shoulder clamping action. The two upper massage arms and the upper massage rolling wheels are driven to be close to each other or away from each other, and the two lower massage arms and the lower
(Continued)

massage rolling wheels are close to each other or away from each other, so as to achieve a kneading action.

20 Claims, 15 Drawing Sheets

(52) U.S. Cl.
CPC ................ *A61H 2015/0007* (2013.01); *A61H 2201/0134* (2013.01); *A61H 2201/0149* (2013.01); *A61H 2201/1614* (2013.01); *A61H 2201/1623* (2013.01); *A61H 2201/1635* (2013.01); *A61H 2201/1669* (2013.01); *A61H 2201/1671* (2013.01)

(58) Field of Classification Search
CPC .... A61H 2201/0149; A61H 2201/1669; A61H 2201/1678; A61H 2205/081
See application file for complete search history.

(56) References Cited

FOREIGN PATENT DOCUMENTS

| | | |
|---|---|---|
| CN | 110314077 | 10/2019 |
| CN | 110314078 | 10/2019 |
| CN | 110353963 | 10/2019 |
| JP | 2018094299 | 6/2018 |
| TW | 201410230 | 3/2014 |

OTHER PUBLICATIONS

English translation of Li CN 107432820 (Year: 2017).*
English translation of Zou et al. CN 109259995 (Year: 2019).*
English translation of Liu CN 205007229 (Year: 2016).*
English translation of Ishikawa et al. WO 2014027494 (Year: 2014).*
"International Search Report (Form PCT/ISA/210) of PCT/CN2020/097416," mailed on Sep. 25, 2020, with English translation thereof, pp. 1-5.

* cited by examiner

MASSAGE ARMCHAIR, AND MASSAGE MECHANISM AND MASSAGE METHOD THEREOF

CROSS-REFERENCE TO RELATED APPLICATION

This application is a 371 of international application of PCT application serial no. PCT/CN2020/097416, filed on Jun. 22, 2020 which claims the priority benefit of China application no. 201910642114.9, no. 201910641351.3, and no. 201910642101.1, filed on Jul. 16, 2019. The entirety of each of the above mentioned patent applications is hereby incorporated by reference herein and made a part of this specification.

FIELD OF THE DISCLOSURE

The disclosure relates to the field of massage chairs, in particular to a massage armchair, and a massage mechanism and a massage method thereof.

DESCRIPTION OF RELATED ART

A massage mechanism with a shoulder-clamping massage function is one of the key design of the massage mechanism, which can bring varieties to the massage techniques that the massage mechanism can achieve.

The patent application with the publication number CN100382775C discloses a massage mechanism scheme with shoulder-clamping massage function. A first massage finger and a second massage finger of the scheme can move close to or away from each other to massage the user's shoulders when a kneading shaft (also known as a kneading driving shaft) rotates. The patent application with publication number TW201410230A discloses another massage mechanism scheme with a shoulder-clamping massage function. This scheme also allows the upper and lower therapeutic devices to move close to or away from each other to massage the user when a massage member is performing a kneading action. The upper and lower massage fingers (therapeutic devices) of these two massage mechanisms are linked, and when they massage the user's shoulders, the upper and lower massage fingers (therapeutic devices) are reciprocally away from and closed to each other.

However, those skilled in the art found that, during the use process, in the motion conversion devices mentioned above, due to the limitation of the parts themselves and the connection relationship between them, the shoulder-clamping massage mechanism cannot achieve a satisfactory strength during the massage process for human body. Even when the shoulder-clamping massage mechanism can achieve a satisfactory strength, the motion conversion device itself does not have a sufficient supporting strength to sustain the satisfactory strength for a long time.

SUMMARY OF THE DISCLOSURE

In view of the above-mentioned problems, the first purpose of the disclosure is to provide a massage mechanism of a massage armchair, which can perform shoulder-clamping massage with an ascending strength, thereby providing satisfactory massage strength during body massage, and the satisfactory massage strength can sustain for a long time.

The second purpose of the disclosure is to provide a massage mechanism of a massage armchair, which can simultaneously realize shoulder-clamping, kneading and percussion massage. The whole massage mechanism has a simple structure and a small size, and can be disposed in a massage armchair, while being able to provide a satisfactory massage strength during the massage process for human body and the satisfactory massage strength can sustain for a long time.

The third purpose of the disclosure is to provide a massage armchair using the above-mentioned massage mechanism.

The third purpose of the disclosure is to provide a massage method for a massage armchair, which can synchronously complete the shoulder-clamping action and the kneading action through a single driving member.

In order to achieve the above purposes, the disclosure adopts the following technical solutions.

A massage mechanism includes a connecting seat, two supporting seat assemblies respectively arranged at left and right sides of the connecting seat, two upper massage arms and two lower massage arms respectively arranged on each supporting seat assemblies. The massage mechanism further includes a connecting shaft is movable on the supporting seat assembly. The bottom end of the upper massage arm is rotatably connected to the connecting shaft, and the bottom end of the lower massage arm is rotatably connected to the connecting shaft. A connecting member has an upper end that is sleeved on the connecting shaft. A kneading shaft is arranged on the connecting seat and connected to the two supporting seat assemblies on the left and right sides of the connecting seat. The kneading shaft is connected to the connecting member. The rotation axis of the kneading shaft forms an inclined angle A with the supporting seat assembly. The rotation axis of the kneading shaft forms an inclined angle B with the connecting member. The inclined angle A and the inclined angle B are equal in value. A first driving assembly is configured to drive the kneading shaft to rotate so as to drive the connecting member and the connecting shaft to reciprocate on the supporting seat assembly, so that the upper massage arm rotates relative to the supporting seat assembly with an axis that perpendicularly passes through point A on the supporting seat assembly as a rotation axis, and the lower massage arm rotates relative to the supporting seat assembly with an axis that perpendicularly passes through point B on the supporting seat assembly as a rotation axis. The points A and B are respectively located on both sides of the connecting shaft, so that the upper massage rolling wheel and the lower massage rolling wheel move close to or away from each other to realize the shoulder-clamping action. In the meantime, the two upper massage arms and the upper massage rolling wheel are driven simultaneously to move close to or away from each other, and the two lower massage arms and the lower massage rolling wheel are driven to move close to or away from each other to achieve a kneading action.

Preferably, the kneading shaft includes a left section, a middle section, and a right section. The left section and the right section of the kneading shaft are sleeved with a first sleeve and a second sleeve that are integrally formed or separated from each other. The first sleeve and the second sleeve have different axes. The supporting seat assembly is sleeved on the first sleeve. The supporting seat assembly and the rotation axis of the kneading shaft form an inclined angle A. The connecting member is sleeved on the second sleeve, the connecting member and the rotation axis of the kneading shaft form an inclined angle B. The inclined angle A and the inclined angle B are equal in value. The first driving assembly drives the kneading shaft to rotate so as to synchronously complete shoulder-clamping and kneading actions.

Preferably, the first sleeve is provided with a fifth mounting hole. The axis of the fifth mounting hole and the axis of the first sleeve form an inclined angle. The supporting seat assembly is sleeved on the first sleeve. The supporting seat assembly and the rotation axis of the kneading shaft form an inclined angle A. The second sleeve is provided with a sixth mounting hole. The axis of the sixth mounting hole and the axis of the second sleeve form an inclined angle. The connecting member is sleeved on the second sleeve. The connecting member and the rotation axis of the kneading shaft form an inclined angle B. The inclined angle A and the inclined angle B are equal in value.

Preferably, the axis of the left section of the kneading shaft and the axis of the middle section of the kneading shaft form an inclined angle. The axis of the right section of the kneading shaft and the axis of the middle section of the kneading shaft form an inclined angle. The supporting seat assembly is sleeved on the first sleeve. The supporting seat assembly and the rotation axis of the kneading shaft form an inclined angle A. The connecting member is sleeved on the second sleeve. The connecting member and the rotation axis of the kneading shaft form an inclined angle B. The inclined angle A and the inclined angle B are equal in value.

Preferably, a first bearing and a second bearing are further provided. The first bearing is sleeved on the first sleeve. The supporting seat assembly is connected to the first sleeve through the first bearing. The second bearing is sleeved on the second sleeve. The connecting member is connected to the second sleeve through the second bearing.

Preferably, the left section and the right section of the kneading shaft are also sleeved with a third sleeve and a fourth sleeve. The diameters of the left section and the right section of the kneading shaft are smaller than the diameter of the middle section of the kneading shaft. The shaft ends of the left section and the right section of the kneading shaft are threadedly connected to a first threaded member. One end surface of the third sleeve is close to the middle section of the kneading shaft and the other end surface of the third sleeve is close to the inner ring of the first bearing. One end surface of the fourth sleeve is close to the first threaded member and the other end surface of the fourth sleeve is close to the inner ring of the second bearing.

Preferably, a third flange is provided on the third sleeve, a fourth flange is provided on the fourth sleeve, a fifth flange is provided on the first sleeve, and a sixth flange is provided on the second sleeve. The fifth flange is close to the sixth flange, the first bearing is sleeved on the first sleeve and the end surfaces on both sides are close to the third flange and the fifth flange, respectively. The supporting seat assembly is connected to the first sleeve through a first bearing. The second bearing is sleeved on the second sleeve and the end surfaces on both sides are respectively close to the fourth flange and the sixth flange. The connecting member is connected to the second sleeve through the second bearing.

Preferably, the supporting seat assembly includes a first plate and a second plate that are fixedly connected. The bottom ends of the upper massage arm and the lower massage arm are located between the first plate and the second plate. The connecting shaft passes through the first plate and/or the second plate. The first plate and the second plate are provided with a position-limiting elongated hole for the movement of the connecting shaft. The first driving assembly is used to drive the connecting shaft to reciprocate up and down in the position-limiting elongated hole, making the upper massage arm rotate with respect to the supporting seat assembly with an axis perpendicularly passing through the point A on the first plate or the second plate as the rotation axis, and the lower massage arm rotate with respect to the supporting seat assembly with an axis perpendicularly passing through the point B on the first plate or the second plate as the rotation axis. The points A and B are respectively located on both sides of the connecting shaft, so that the upper massage rolling wheel and the lower massage rolling wheel move close to or far away from each other to achieve shoulder-clamping action. Meanwhile, the two upper massage arms and the upper massage rolling wheel are simultaneously driven to move close to away from each other, and the two lower massage arms and the lower massage rolling wheel are driven to move close to or away from each other to realize the kneading action.

Preferably, at least one first rotating connecting member and at least one second rotating connecting member are provided at point A on the first plate or the second plate. The first rotating connecting member is sleeved on the second rotating connecting member. The upper massage arm is connected to the first rotating connecting member or the second rotating connecting member, and the upper massage arm is rotatable relative to the first rotating connecting member and/or the second rotating connecting member. At least one third rotating connecting member and at least one fourth rotating connecting member are provided at point B on the first plate or the second plate. The third rotating connecting member is sleeved on the fourth rotating connecting member, and the lower massage arm is connected to the third rotating connecting member or the fourth rotating connecting member. The lower massage arm is rotatable relative to the third rotating connecting member and/or the fourth rotating connecting member.

A massage mechanism includes a connecting seat, two supporting seat assemblies respectively arranged on the left and right sides of the connecting seat, and two upper massage arms and two lower massage arms arranged on the supporting seat assemblies. The massage mechanism further includes a kneading shaft is arranged on the connecting seat and connected to the two supporting seat assemblies on the left and right sides of the connecting seat. The rotation axis of the kneading shaft forms an inclined angle A with the supporting seat assembly. A percussion shaft is arranged on the connecting seat, and the percussion shaft is distributed parallel to the kneading shaft. A percussion assembly has one end connected to supporting seat assembly and the other end sleeved on the percussion shaft. A first driving assembly is disposed on the connecting seat, configured to drive the kneading shaft to rotate so that the upper massage rolling wheel and the lower massage rolling wheel move close to or away from each other to realize the shoulder-clamping action. In the meantime, the two upper massage arms and the upper massage rolling wheel are simultaneously driven to move close to or away from each other, and the two lower massage arms and the lower massage rolling wheel are driven to move close to or away from each other to realize the kneading action. A second driving assembly is configured to drive the percussion shaft to rotate to drive the percussion assembly to perform reciprocating motion, so that the upper massage arm and the lower massage arm swing back and forth to realize the percussion action.

Preferably, the massage mechanism further includes a connecting shaft. The connecting shaft is movable on a supporting seat assembly. The bottom end of the upper massage arm is rotatably connected to the connecting shaft, and the bottom end of the lower massage arm is rotatably connected to the connecting shaft. A connecting member has an upper end sleeved on the connecting shaft and a lower end sleeved on the kneading shaft. The connecting member and the rotation axis of the kneading shaft form an inclined angle B. The inclined angle B and the inclined angle A are equal in value. The first driving assembly drives the kneading shaft to rotate so as to drive the connecting member and the connecting shaft to reciprocate on the supporting seat assembly, so that the upper massage arm rotates relative to the supporting seat assembly with an axis that perpendicularly passes through point A on the supporting seat assembly as the rotation axis, and the lower massage arm rotates relative to the supporting seat assembly with an axis that perpendicularly passes through point B on the supporting seat assembly as the rotation axis. The points A and B are respectively located on both sides of the connecting shaft, such that the upper massage rolling wheel and the lower massage rolling wheel move close to or away from each other to realize the shoulder-clamping action. In the meantime, the two upper massage arms and the upper massage rolling wheel are simultaneously driven to move close to away from each other, and the two lower massage arms and the lower massage rolling wheel are driven to move close to or away from each other to realize the kneading action.

Preferably, the kneading shaft includes a left section, a middle section, and a right section. The left section and the right section of the kneading shaft are sleeved with a first sleeve and a second sleeve that are integrally formed or separated from each other. The first sleeve and the second sleeve have different axes. The supporting seat assembly is sleeved on the first sleeve. The supporting seat assembly and the rotation axis of the kneading shaft form an inclined angle A. The connecting member is sleeved on the second sleeve, the connecting member and the rotation axis of the kneading shaft form an inclined angle B. The inclined angle A and the inclined angle B are equal in value. The first driving assembly drives the kneading shaft to rotate so as to synchronously complete shoulder-clamping and kneading actions.

Preferably, the percussion shaft includes a left section, a middle section, and a right section. The left section of the percussion shaft and the middle section of the percussion shaft have different axes. The right section of the percussion shaft and the middle section of the percussion shaft have different axes. The second driving assembly drives the middle section of the percussion shaft to rotate to drive the percussion assembly to reciprocate, so that the upper massage arm and the lower massage arm swing back and forth to complete the percussion action.

Preferably, the percussion assembly includes a fifth bearing, a percussion bearing seat and a ball joint rod. The fifth bearing is sleeved on the left and right sections of the percussion shaft. The percussion bearing seat is sleeved on the fifth bearing. One end of the ball joint rod is hinged with the percussion bearing seat, and the other end of the ball joint rod is movably connected to the supporting seat assembly. The second driving assembly drives the middle section of the percussion shaft to rotate to drive the ball joint rod to reciprocate, so that the upper massage arm and the lower massage arm swing back and forth to complete the percussion action.

Preferably, a first bearing and a second bearing are further provided. The first bearing is sleeved on the first sleeve. The supporting seat assembly is connected to the first sleeve through the first bearing. The second bearing is sleeved on the second sleeve. The connecting member is connected to the second sleeve through the second bearing.

Preferably, the left section and the right section of the kneading shaft are also sleeved with a third sleeve and a fourth sleeve. The diameters of the left section and the right section of the kneading shaft are smaller than the diameter of the middle section of the kneading shaft. The shaft ends of the left section and the right section of the kneading shaft are threadedly connected to a first threaded member. One end surface of the third sleeve is close to the middle section of the kneading shaft and the other end surface of the third sleeve is close to the inner ring of the first bearing. One end surface of the fourth sleeve is close to the first threaded member and the other end surface of the fourth sleeve is close to the inner ring of the second bearing.

Preferably, the supporting seat assembly includes a first plate and a second plate that are fixedly connected. The bottom ends of the upper massage arm and the lower massage arm are located between the first plate and the second plate. The connecting shaft passes through the first plate and/or the second plate. The first plate and the second plate are provided with a position-limiting elongated hole for the movement of the connecting shaft. The first driving assembly is used to drive the connecting shaft to reciprocate up and down in the position-limiting elongated hole, making the upper massage arm rotate with respect to the supporting seat assembly with an axis perpendicularly passing through the point A on the first plate or the second plate as the rotation axis, and the lower massage arm rotate with respect to the supporting seat assembly with an axis perpendicularly passing through the point B on the first plate or the second plate as the rotation axis. The points A and B are respectively located on both sides of the connecting shaft, so that the upper massage rolling wheel and the lower massage rolling wheel move close to or far away from each other to achieve shoulder-clamping action. Meanwhile, the two upper massage arms and the upper massage rolling wheel are simultaneously driven to move close to away from each other, and the two lower massage arms and the lower massage rolling wheel are driven to move close to or away from each other to realize the kneading action.

Preferably, at least one first rotating connecting member and at least one second rotating connecting member are provided at point A on the first plate or the second plate. The first rotating connecting member is sleeved on the second rotating connecting member. The upper massage arm is connected to the first rotating connecting member or the second rotating connecting member, and the upper massage arm is rotatable relative to the first rotating connecting member and/or the second rotating connecting member. At least one third rotating connecting member and at least one fourth rotating connecting member are provided at point B on the first plate or the second plate. The third rotating connecting member is sleeved on the fourth rotating connecting member, and the lower massage arm is connected to the third rotating connecting member or the fourth rotating connecting member. The lower massage arm is rotatable relative to the third rotating connecting member and/or the fourth rotating connecting member.

A massage armchair includes the above-mentioned clamping and kneading massage mechanism.

A massage method of the above-mentioned massage armchair performs shoulder-clamping massage while performing kneading massage. The kneading massage refers to the action of the two upper massage rolling wheels distributed on the left and right and the two lower massage rolling wheels distributed on the left and right moving close to or away from each other while swinging. The shoulder-clamping massage refers to the action of the upper massage rolling wheel and the lower massage rolling wheel distributed at the front and back moving close to or away from each other.

Preferably, the specific process of the kneading massage is: the first driving assembly drives the kneading shaft to rotate. Two first sleeves sleeved on the left and right ends of the kneading shaft rotate. Two first bearings respectively sleeved on the outer rings of the two first sleeves perform eccentric rotation with swing. Two supporting seat assemblies respectively sleeved on the outer rings of the two first bearings move close to or away from each other while swinging. Two upper massage arms respectively arranged on the two supporting seat assemblies move close to or away from each other while swinging. Two lower massage arms respectively arranged on the two supporting seat assemblies move close to or away from each other while swinging. Two upper massage rolling wheels respectively arranged on the two upper massage arms move close to or away from each other while swinging. Two lower massage rolling wheels respectively arranged on the two lower massage arms move close to or away from each other while swinging. Preferably, the specific process of the shoulder-clamping massage is: the first driving assembly drives the kneading shaft to rotate. Two second sleeves sleeved on the left and right ends of the kneading shaft rotate. The second bearing sleeved on the outer ring of the second sleeve performs eccentric rotation with swing. The first connecting member sleeved on the outer ring of the second bearing reciprocates up and down. The connecting shaft connected to the first connecting member reciprocates up and down. The upper massage arm and the lower massage arm, which are rotatably connected to the connecting shaft, move close to or away from each other during rotation. The upper massage rolling wheel and the lower massage rolling wheel complete the action of moving close to or away from each other once.

Preferably, the first bearing is sleeved on a first outer side wall of the first sleeve, the second bearing is sleeved on the second outer side wall of the second sleeve. The first outer side wall and the rotation axis of the kneading shaft form an inclined angle A. The second outer side wall and the rotation axis of the kneading axis form an inclined angle B. The inclined angle A and the inclined angle B are equal in value.

Preferably, the axis of the second outer side wall is located right below the axis of the first outer side wall. The first driving assembly drives the kneading shaft to rotate half a turn. When the two upper massage rolling wheels move to change a distance therebetween from the largest separation distance to the smallest separation distance and the two lower massage rolling wheels move to change a distance therebetween from the largest separation distance to the smallest separation distance, the upper massage rolling wheel and the lower massage rolling wheel move to change a distance therebetween from the smallest separation distance to the largest separation distance.

Preferably, the axis of the second outer side wall is located right above the axis of the first outer side wall. The first driving assembly drives the kneading shaft to rotate half a turn. When the two upper massage rolling wheels move to change a distance therebetween from the largest separation distance to the smallest separation distance and the two lower massage rolling wheels move to change a distance therebetween from the largest separation distance to the smallest separation distance, the upper massage rolling wheel and the lower massage rolling wheel move to change a distance therebetween from the largest separation distance to the smallest separation distance.

Preferably, the axis of the second outer side wall and the axis of the first outer side wall are not on the same vertical plane. The first driving assembly drives the kneading shaft to rotate half a turn. When the two upper massage rolling wheels move to change a distance therebetween from the largest separation distance to the smallest separation distance and the two lower massage rolling wheels move to change a distance therebetween from the largest separation distance to the smallest separation distance, the upper massage rolling wheel and the lower massage rolling wheel are in the process of moving to change the largest separation distance to the smallest separation distance or moving to change the smallest separation distance to the largest separation distance.

Preferably, each first sleeve and a respective one of the second sleeves are integrally formed or fixedly connected.

Preferably, the first driving assembly includes a kneading motor and a first decelerator, and the kneading motor decelerates and drives the kneading shaft to rotate through the first decelerator.

Technical Effects of the Disclosure

1) The kneading shaft is driven to rotate by the first driving assembly to drive the connecting member and the connecting shaft to reciprocate on the supporting seat assembly, so that the upper massage arm and the lower massage arm move close to or away from each other, and the upper massage rolling wheel and the lower massage rolling wheel move close to or away from each other to realize the shoulder-clamping action. Meanwhile, the two upper massage arms and the upper massage rolling wheel are simultaneously driven to move close to away from each other, and the two lower massage arms and the lower massage rolling wheel are driven to move close to or away from each other to realize the kneading action. That is, by rotating a single kneading shaft, the shoulder-clamping and kneading actions of the massage mechanism can be completed synchronously, and the structure is simple, thereby reducing the size of the entire mechanism.

2) The middle section of the percussion shaft is driven to rotate through the second driving assembly to drive the percussion assembly to reciprocate, so that the upper massage arm and the lower massage arm swing back and forth to complete the percussion action. Specifically, by simply rotating the single kneading shaft, the shoulder-clamping and kneading actions of the massage mechanism can be completed synchronously. In this way, the three massage actions of shoulder-clamping, kneading and percussion can be realized with only two shafts, and the structure is simple, thereby reducing the size of the entire mechanism.

3) In the disclosure, through clever design of different axes of the first sleeve and the second sleeve as well as the common inclined angle A between the first sleeve and the second sleeve and the rotation axis of the kneading shaft, the horizontal movements of the connecting member and the supporting seat assembly are synchronized, while their vertical movements are different. In this way, by simply rotating the single kneading shaft, it is possible to simultaneously complete the shoulder-clamping and kneading actions of the massage mechanism.

DESCRIPTION OF EMBODIMENTS

Figure 1:
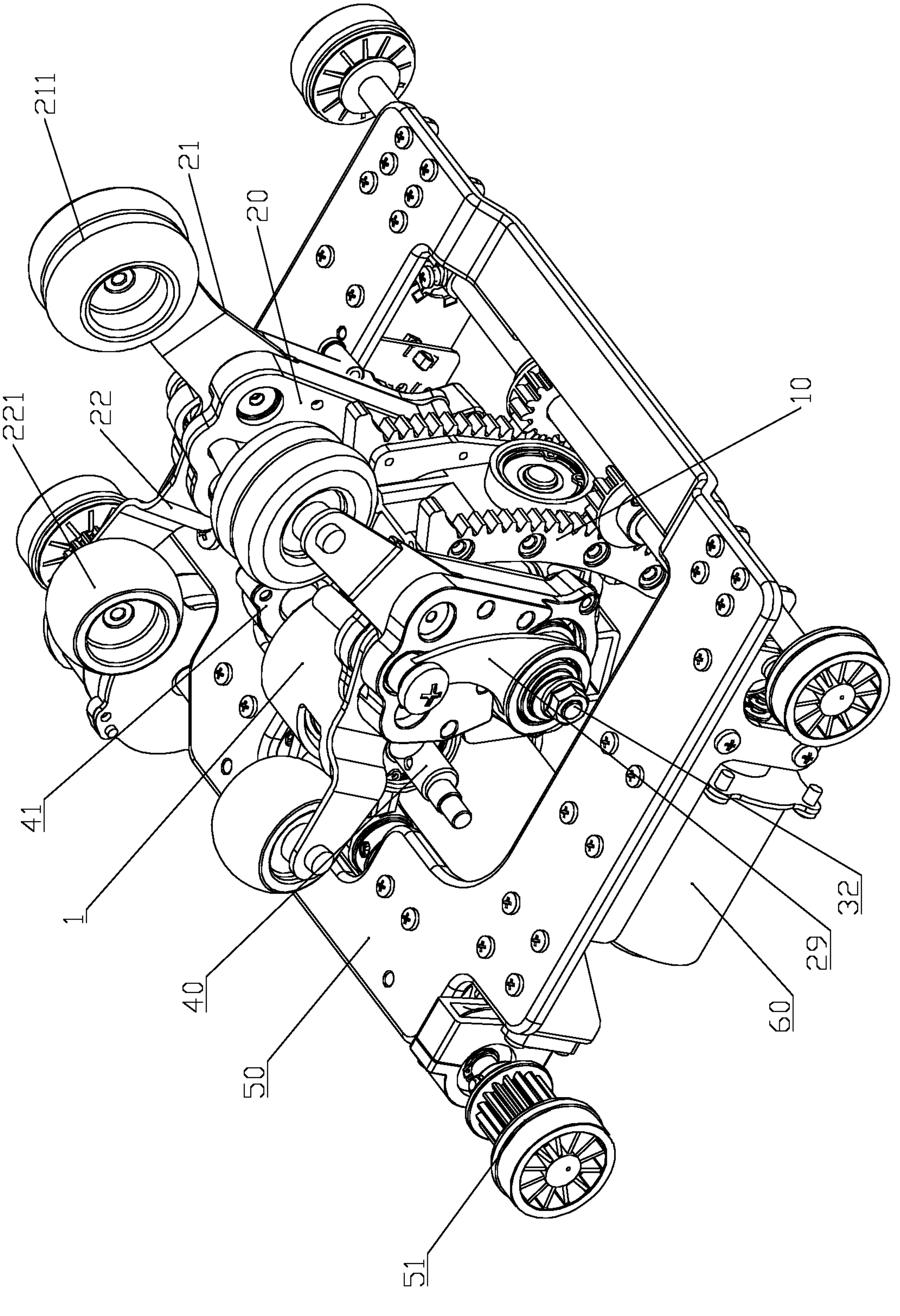
FIG. 1 is a schematic structural view of a massage mechanism of the disclosure.

The embodiments of the present disclosure are described in detail below. Examples of the embodiments are shown in the accompanying drawings, in which the same or similar reference numerals indicate the same or similar elements or elements with the same or similar functions. The embodiments described below with reference to the drawings are exemplary, and are intended to explain the present disclosure, but should not be construed as limiting the present disclosure.

In the description of the present disclosure, it should be understood that the terms “center”, “longitudinal”, “transverse”, “length”, “width”, “thickness”, “upper”, “lower”, “front”, “rear”, “left”, “right”, “vertical”, “horizontal”, “top”, “bottom”, “inner”, “clockwise”, and “counterclockwise” indicating the orientation or positional relationship are based on the direction or positional relationship shown in the attached figure, and are only for the convenience of describing the present disclosure and simplifying the description, rather than indicating or implying that the device or element referred to must have a specific orientation, be constructed and operated in a specific orientation, and therefore should not be construed as a limitation to the present disclosure.

In addition, the terms “first” and “second” are only used for descriptive purposes, and should not be construed as indicating or implying relative importance or implicitly indicating the number of indicated technical features. Therefore, the features defined with “first” and “second” may explicitly or implicitly include one or more of these features. In the description of the present disclosure, unless otherwise specified, “plurality” means two or more, unless otherwise clearly defined.

In the present disclosure, unless otherwise clearly specified and limited, the terms “installed”, “linked”, “connected”, “fixed” and other terms should be understood in a broad sense, for example, which can mean a fixed connection or a detachable connection, or integral connection; can mean a mechanical connection or an electrical connection; can mean direct connection, or indirect connection through an intermediate medium, and can mean the internal communication between two components. For those of ordinary skill in the art, the specific meanings of the above-mentioned terms in the present disclosure can be understood according to specific situations.

In the present disclosure, unless explicitly specified and defined otherwise, the first feature being “on” or “under” the second feature may include direct contact between the first and second features, or may include the first and second features not in direct contact but indirect contact through other features between them. Moreover, the first feature being “above”, “on” and “on top of” the second feature includes the first feature being directly above and obliquely above the second feature, or it simply means that the level of the first feature is higher than that of the second feature. The first feature being “below”, “beneath”, and “under” the second feature includes the first feature directly below and obliquely below the second feature, or it simply means that the level of the first feature is lower than the second feature.

First Embodiment

Figure 6:
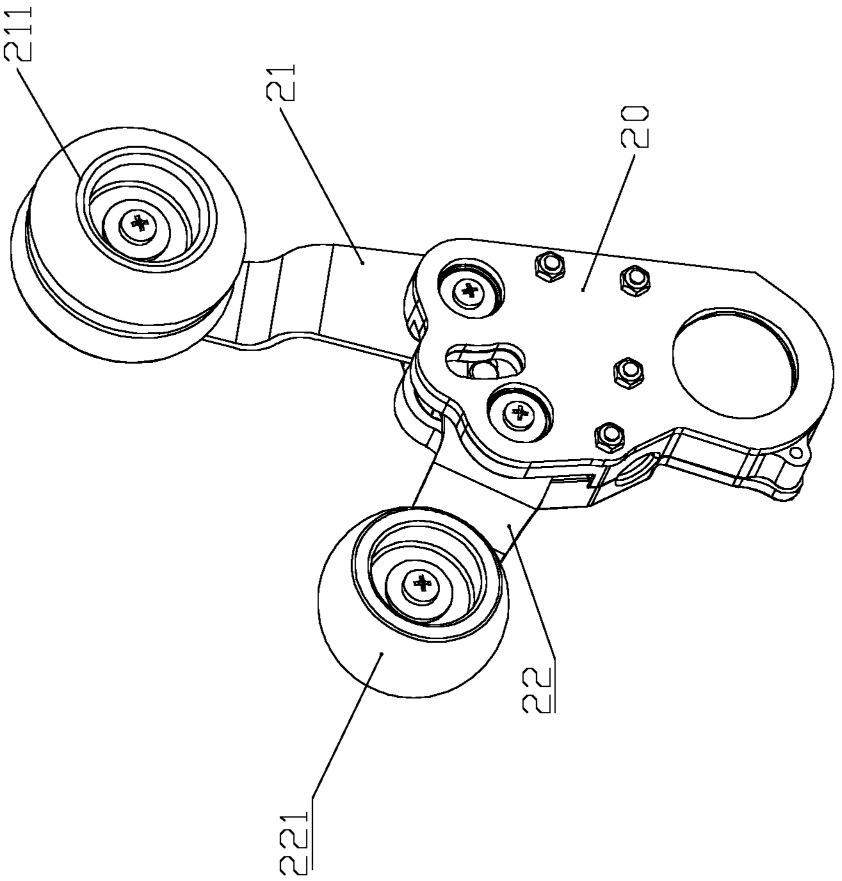
FIG. 6 is a first schematic structural view of the shoulder-clamping massage mechanism of the disclosure.
Figure 7:
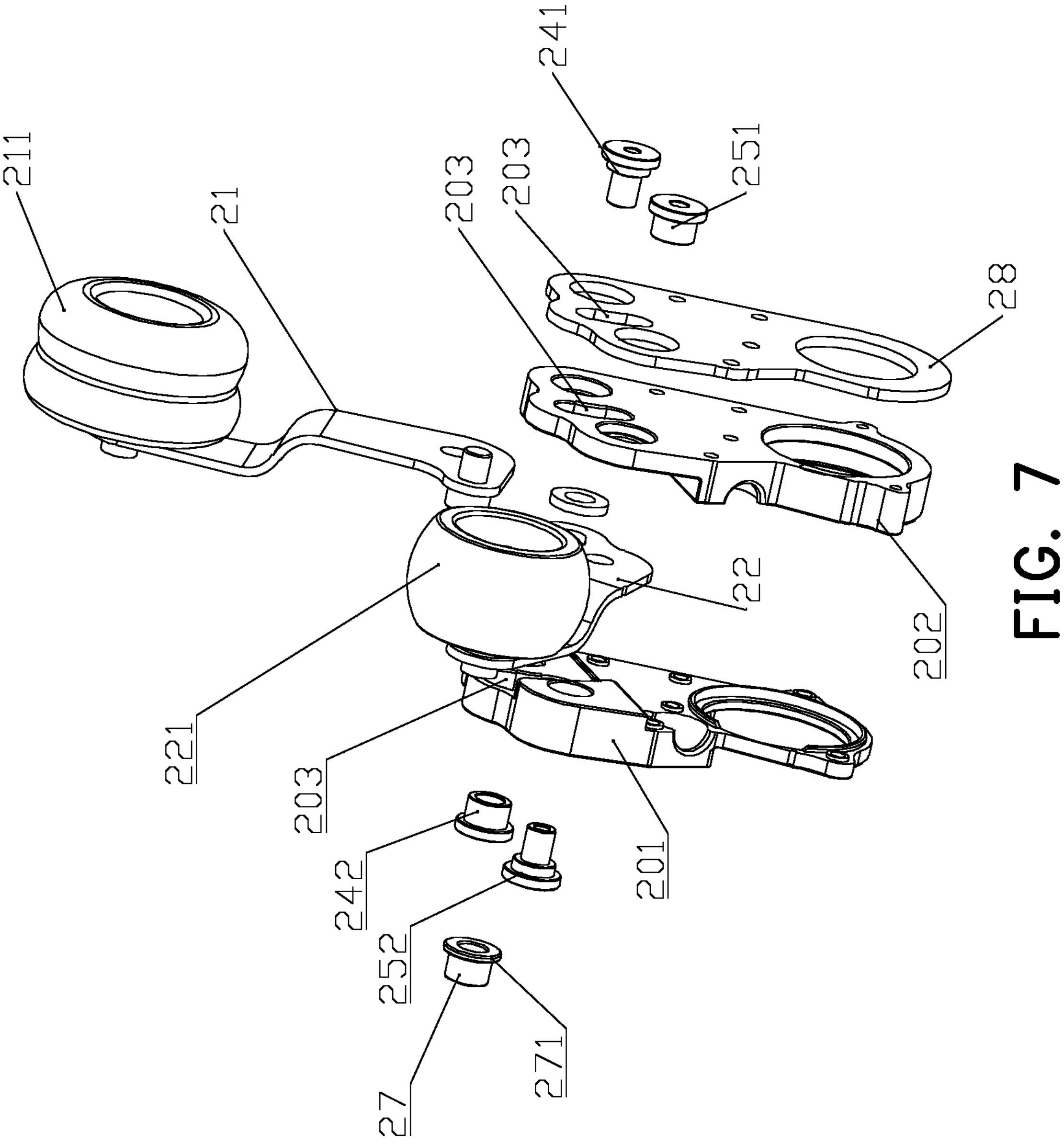
FIG. 7 is an exploded schematic view of FIG. 6.

A shoulder-clamping massage mechanism as shown in FIG. 6 and FIG. 7 includes a supporting seat assembly 20, an upper massage arm 21 and a lower massage arm 22 mounted on a supporting seat assembly 20, and an upper massage rolling wheel 211 mounted on top of the upper massage arm 21 and a lower massage rolling wheel 221 mounted at the top of the lower massage arm 22 in the manner of rolling circumferentially. The improvement being made is that a connecting shaft 23 and a first driving assembly 31 are further provided. The connecting shaft 23 is movable on the supporting seat assembly 20. The bottom end of the upper massage arm 21 is rotatably connected to the connecting shaft 23, and the bottom end of the lower massage arm 22 is rotatably connected to the connecting shaft 23. The first driving assembly 31 is configured to drive the connecting shaft 23 to reciprocate up and down on the supporting seat assembly 20, so that the upper massage arm 21 rotates relative to the supporting seat assembly 20 with the axis that perpendicularly passes through point A on the supporting seat assembly 20 as the rotation axis, and the lower massage arm 22 rotates relative to the supporting seat assembly 20 with the axis that perpendicularly passes through point B on the supporting seat assembly 20 as the rotation axis. The points A and B are respectively located on both sides of the connecting shaft 23, so that the upper massage rolling wheel 211 and the lower massage rolling wheel 221 move close to or away from each other to realize shoulder-clamping action.

In this process, the first driving assembly 31 only needs to drive the connecting shaft 23 to move downward for a short distance, and the upper massage arm 21 and the lower massage arm 22 will move closer to each other at a longer distance. That is, after the connecting shaft 23 moves downward for a short distance, the upper massage rolling wheel 211 and the lower massage rolling wheel 221 can apply a satisfactory massage force to the human body during the clamping process. The structure of the disclosure is simple, and the entire mechanism has high stability.

Specifically, the supporting seat assembly 20 includes a first plate 201 and a second plate 202 that are fixedly connected. The bottom ends of the upper massage arm 21 and the lower massage arm 22 are located between the first plate 201 and the second plate 202. The connecting shaft 23 passes through the first plate 201 and/or the second plate 202. The first plate 201 and the second plate 202 are provided with a position-limiting elongated hole 203 for the movement of the connecting shaft 23. The first driving assembly 31 is used to drive the connecting shaft 23 to reciprocate up and down in the position-limiting elongated hole 203, making the upper massage arm 21 rotate with respect to the supporting seat assembly 20 with an axis perpendicularly passing through the point A on the first plate 201 or the second plate 202 as the rotation axis, and the lower massage arm 22 rotate with respect to the supporting seat assembly 20 with an axis perpendicularly passing through the point B on the first plate 201 or the second plate 202 as the rotation axis. The points A and B are respectively located on both sides of the connecting shaft 23, so that the upper massage rolling wheel 211 and the lower massage rolling wheel 221 move close to or far away from each other to realize the shoulder-clamping action. More preferably, the upper massage arm 21 is close to the inner surface of the second plate 202, and the lower massage arm 22 is close to the inner surface of the first plate 201. A first pad 26 is also provided between the first plate 201 and the second plate 202. The first pad 26 is sleeved on the connecting shaft 23. The two end surfaces of the first pad 26 are slightly in contact with the lower end surfaces of the upper massage arm 21 and the lower massage arm 22, respectively. In the process, the upper massage arm 21 and the lower massage arm 22 are under the condition of being subjected to force at both ends, and therefore the upper massage arm 21 and the lower massage arm 22 are likely to arch or even break in the middle. However, the inner surface of the first plate 201, the inner surface of the second plate 202, and the end surfaces on both sides of the first pad 26 can prevent the risk of arching and breaking at the middle of the upper massage arm 21 and the lower massage arm 22.

Specifically, a blocking part is further provided. The blocking part is located between the upper massage arm 21 and the lower massage arm 22 and is sleeved on the connecting shaft 23. The blocking part is used to prevent the lower massage arm 22 and the upper massage arm 21 from sliding on the connecting shaft 23. The blocking part may be integrally formed with the upper massage arm 21 or the lower massage arm 22, or may be a separate component. In this embodiment, the blocking part is the first pad 26, and the first pad 26 is located between the upper massage arm 21 and the lower massage arm 22 and is sleeved on the connecting shaft 23.

There are many ways to fix the connecting shaft 23. In this embodiment, the bottom end of the upper massage arm 21 is provided with a first threaded part, and the connecting shaft 23 passes through the first plate 201, the lower massage arm 22, and the first pad 26 and is threadedly fitted with the first threaded part.

In other embodiments, the bottom end of the lower massage arm 22 is provided with a second threaded part, and the connecting shaft 23 passes through the second plate 202, the upper massage arm 21 and the first pad 26 and is threadedly fitted with the second threaded part.

In other embodiments, the connecting shaft 23 passes through the first plate 201, the lower massage arm 22, the first pad 26, the upper massage arm 21, and the second plate 202 in sequence, and is fixed to the first plate 201 and the second plate 202 through a threaded member.

Specifically, the upper massage arm 21 is rotatably connected to the connecting shaft 23 through a first mounting hole, the lower massage arm 22 is rotatably connected to the connecting shaft 23 through a second mounting hole, and at least one of the first mounting hole and the second mounting hole is an elongated hole. In this embodiment, a connecting shaft 23 is used to simultaneously drive the upper massage arm 21 to rotate relative to the supporting seat assembly 20 with an axis that perpendicularly passes through point A on the supporting seat assembly 20 as a rotation axis, and drive the lower massage arm 22 to rotate relative to the supporting seat assembly 20 with an axis that perpendicularly passes through point B on the supporting seat assembly 20 as a rotation axis. The movement trajectories of the two rotations with different centers are not likely to be consistent, and therefore at least one of the first mounting hole and the second mounting hole is an elongated hole. In this way, it is possible to use a connecting shaft 23 to drive the upper massage arm 21 and the lower massage arm 22 to rotate simultaneously.

In this embodiment, the second mounting hole is an elongated hole. The first mounting hole clearance fits with the connecting shaft 23, the third mounting hole clearance fits with the first positioning assembly, and the fourth mounting hole clearance fits with the second positioning assembly. In this way, during the shoulder-clamping process, the upper massage arm 21 uses the axis perpendicularly passing through point A on the first plate 201 or the second plate 202 as the rotation axis to perform a fixed-point circumferential motion, and the lower massage arm 22 uses the axis perpendicularly passing through point B on the first plate 201 or the second plate 202 as the rotation axis to perform an unfixed-point circumferential motion. In addition, the position-limiting elongated hole 203 is an arc-shaped position-limiting elongated hole 203 for cooperating with the circumferential motion of the upper massage arm 21.

In other embodiments, the first mounting hole is an elongated hole, the second mounting hole clearance fits with the connecting shaft 23, the third mounting hole clearance fits with the first positioning assembly, and the fourth mounting hole clearance fits with the second positioning assembly. In this way, during the shoulder-clamping process, the upper massage arm 21 uses the axis that perpendicularly passes through point A on the first plate 201 or the second plate 202 as the rotation axis to perform an unfixed-point circumferential motion, and the lower massage arm 22 uses the axis that perpendicularly passes through point B on the first plate 201 or the second plate 202 as the rotation axis to perform a fixed-point circumferential motion. In addition, the position-limiting elongated hole 203 is an arc-shaped position-limiting elongated hole 203 for cooperating with the circumferential motion of the lower massage arm 22.

Specifically, at least one first rotating connecting member 241 and at least one second rotating connecting member 242 are provided at point A on the first plate 201 or the second plate 202. The first rotating connecting member 241 is sleeved on the second rotating connecting member 242. The upper massage arm 21 is connected to the first rotating connecting member 241 or the second rotating connecting member 242, and the upper massage arm 21 is rotatable relative to the first rotating connecting member 241 and/or the second rotating connecting member 242.

Specifically, at least one third rotating connecting member 252 and at least one fourth rotating connecting member 251 are provided at point B on the first plate 201 or the second plate 202. The third rotating connecting member 252 is sleeved on the fourth rotating connecting member 251, and the lower massage arm 22 is connected to the third rotating connecting member 252 or the fourth rotating connecting member 251. The lower massage arm 22 is rotatable relative to the third rotating connecting member 252 and/or the fourth rotating connecting member 251.

In this embodiment, the first rotating connecting member 241 is fixed on the first plate 201 by a threaded member, and the second rotating connecting member 242 is fixed on the second plate 202 by a threaded member. The first rotating connecting member 241 is sleeved on the second rotating connecting member 242, and the upper massage arm 21 is non-slidably sleeved on the second rotating connecting member 242. Of course, the first rotating member may also be integrally formed with the first plate 201, and the second rotating member may be integrated with the second plate 202.

In other embodiments, the first rotating connecting members 241 are arranged in pairs, and are integrally formed with the two side surfaces of the bottom end of the upper massage arm 21. The second rotating connecting members 242 are arranged in pairs and are respectively fixedly connected or integrally formed with the first plate 201, and fixedly connected or integrally formed with the second plate 202. The paired first rotating connecting members 241 are sleeved on the second rotating connecting member 242.

In other embodiments, the second rotating connecting members 242 are arranged in pairs, and are integrally formed with the two side surfaces of the bottom end of the upper massage arm 21. The first rotating connecting members 241 are arranged in pairs and are respectively fixedly connected or integrally formed with the first plate 201, and fixedly connected or integrally formed with the second plate 202. The paired first rotating connecting members 241 are sleeved on the second rotating connecting member 242.

The structure of the third rotating connecting member 252 and the fourth rotating connecting member 251 is any one of the above three embodiments. In this embodiment, the third rotating connecting member 252 is fixed on the first plate 201 through a threaded member, the fourth rotating connecting member 251 is fixed on the second plate 202 through a threaded member, the third rotating connecting member 252 is sleeved on the fourth rotating connecting member 251, and the upper massage arm 21 is non-slidably sleeved on the fourth rotating connecting member 251.

Specifically, the first driving assembly 31 includes a first connecting assembly and a driving member. One end of the first connecting assembly is connected to the connecting shaft 23, and the other end of the first connecting assembly is connected to the driving member. The driving member drives the first connecting assembly to drive the connecting shaft 23 to reciprocate in the position-limiting elongated hole 203, so that the upper massage rolling wheel 211 and the lower massage rolling wheel 221 move close to or far away from each other to realize the shoulder-clamping action.

Specifically, the driving member is a first motor. The first connecting assembly includes a kneading shaft 32 and a first connecting member 29. The first connecting member 29 is rotatably connected to the kneading shaft 32, and the kneading shaft 32 is connected to a first motor. One end of the first connecting member 29 is sleeved on the connecting shaft 23. The first motor drives the kneading shaft 32 to rotate so as to drive the first connecting member 29 to reciprocate and simultaneously drive the connecting shaft 23 to reciprocate in the position-limiting elongated hole 203, so that the upper massage rolling wheel 211 and the lower massage rolling wheel 221 move close to or far away from each other to realize the shoulder-clamping action.

Specifically, a fifth sleeve 27 is sleeved on the connecting shaft 23, a first flange 271 is provided on the fifth sleeve 27, and a second flange 231 is provided on the connecting shaft 23. One side of the first flange 271 of the fifth sleeve 27 is close to the bottom end of the upper massage arm 21 or the bottom end of the lower massage arm 22, and the other side is close to the second flange 231. One end of the first connecting member 29 is sleeved on the fifth sleeve 27, and is respectively close to the first flange 271 and the second flange 231. The first motor drives the connecting shaft 23 through the first connecting member 29 to reciprocate up and down in the position-limiting elongated hole 203, so that the upper massage rolling wheel 211 and the lower massage rolling wheel 221 move close to or far away from each other to realize the shoulder-clamping action.

It should be noted that the driving member may also be an air cylinder and an oil cylinder. Under the circumstances, the first connecting assembly only includes the first connecting member 29, and the air cylinder or the oil cylinder directly drives the first connecting member 29 to drive the connecting shaft 23 to reciprocate in the position-limiting elongated hole 203, so that the upper massage rolling wheel 211 and the lower massage rolling wheel 221 move close to or far away from each other to realize the shoulder-clamping action.

Specifically, a reinforcing plate 28 is also provided, and the reinforcing plate 28 is fixed on the first plate 201 or the second plate 202 through at least three fasteners, and the at least two fasteners are located around point A and point B on the first plate 201 or the second plate 202. The reinforcing plate 28 at least can cover the upper half area of the first plate 201 or the second plate 202.

Figure 15:
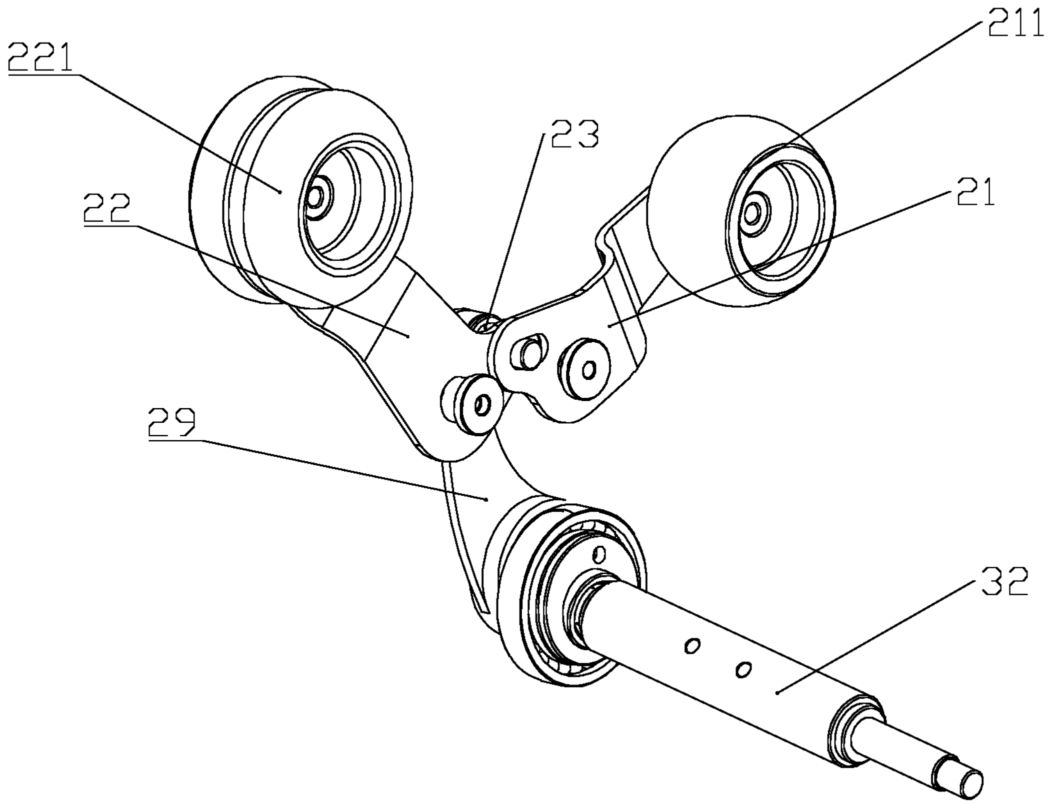
FIG. 15 is a second schematic structural view of the shoulder-clamping massage mechanism of the disclosure (supporting seat assembly is omitted).

As shown in FIG. 15, when viewed from bottom to top, the middle section of the upper massage arm 21 extends horizontally toward the first plate 201, and the middle section of the lower massage arm 22 extends horizontally toward the first plate 201. When the embodiment of the disclosure is in the shoulder-clamping state, after the force borne by the upper massage rolling wheel 211 is transmitted by the upper massage arm 21, the lower half of the upper massage arm 21 has a tendency to tilt or arch toward the second plate 202, and after the force borne by the lower massage rolling wheel 221 is transmitted by the lower massage arm 22, the lower half of the lower massage arm 22 has a tendency to tilt or arch toward the second plate 202. Therefore, in this embodiment, the reinforcing plate 28 is fixed to the second plate 202 through four threaded members, and two of the fasteners are located around points A and B on the second plate 202. The outer contour of the reinforcing plate 28 is the same as the outer contour of the second plate 202.

Of course, if viewed from bottom to top, the middle section of the upper massage arm 21 extends horizontally toward the second plate 202, and the middle section of the lower massage arm 22 extends horizontally toward the second plate 202. Under the circumstances, the reinforcing plate 28 should be fixed on the first plate 201.

The assembly process of the shoulder-clamping massage mechanism is as follows.

1) The first connecting member 29 is sleeved on the fifth sleeve 27, and then the fifth sleeve 27 is sleeved on the connecting shaft 23.

2) The connecting shaft 23 passes through the first plate 201, the lower massage arm 22 and the first pad 26 and threadedly fit with the first threaded part of the upper massage arm 21.

3) The first rotating connecting member 241, the second rotating connecting member 242, the third rotating connecting member 252 and the fourth rotating connecting member 251 are respectively arranged at the points A and B on the first plate 201 and the second plate 202. During the assembly process, the upper massage arm 21 is set to be sleeved on the first rotating connecting member 241 and the lower massage arm 22 is set to be sleeved on the third rotating connecting member 252.

4) After the reinforcing plate 28 is aligned with the second plate 202, they are fixed on the first plate 201 through a threaded member, and then the threaded member is utilized to fix the first rotating connecting member 241, the second rotating connecting member 242, the third rotating connecting member 252, and the fourth rotating connecting member 251 on the first plate 201 and the second plate 202.

5) The upper massage rolling wheel 211 and the lower massage rolling wheel 221 are respectively arranged on the upper massage arm 21 and the lower massage arm 22.

A massage armchair includes a seat part, a backrest part connected to the seat part, and a support part for supporting the seat part, and the shoulder-clamping massage mechanism as described above is configured on the backrest part.

Second Embodiment

Figure 3:
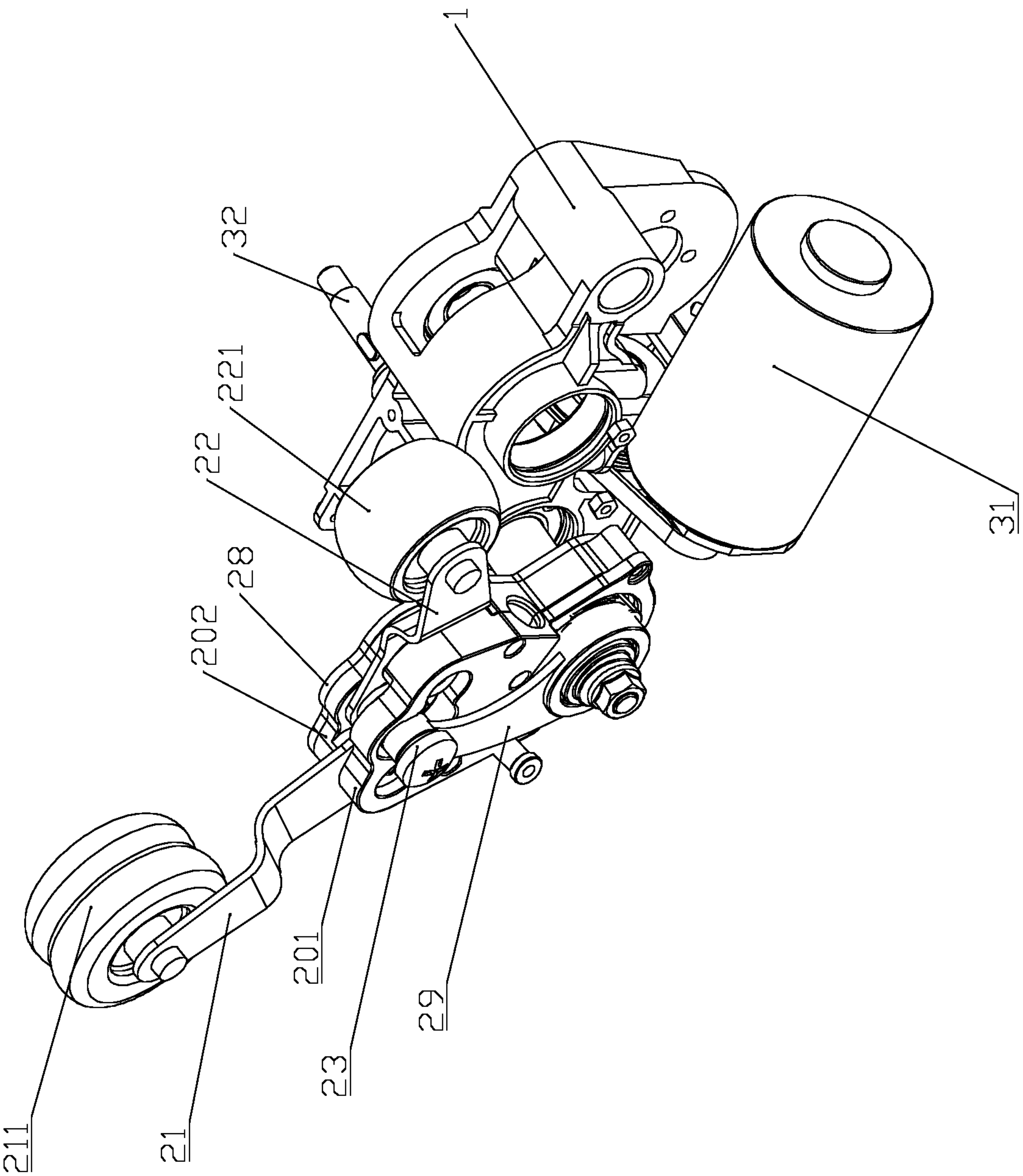
FIG. 3 is a first schematic structural view of a clamping and kneading massage mechanism of the disclosure.

In this embodiment, the shoulder-clamping massage mechanism cooperates with the kneading shaft 32 to form a clamping-kneading massage mechanism as shown in FIG. 3. In this manner, other than the existing massage motion, the shoulder-clamping massage mechanism can further integrate the kneading massage technique to realize the combination of different massage techniques.

Figure 16:
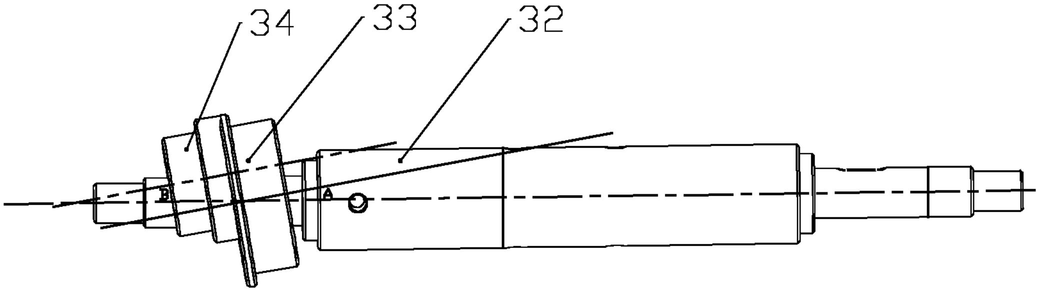
FIG. 16 is a schematic diagram of the assembly of the kneading shaft with the first sleeve and the second sleeve of the disclosure.

A clamping and kneading massage mechanism is as shown in FIG. 3, FIG. 15 and FIG. 16, including two shoulder-clamping massage mechanisms as described in the first embodiment, and also including a connecting seat 1, a first driving assembly 31, a first connecting member 29, and a kneading shaft 32. The two shoulder-clamping massage mechanisms are arranged on both sides of the connecting seat 1 through the kneading shaft 32. The kneading shaft 32 is arranged on the connecting seat 1 and is connected to the two supporting seat assemblies 20 on the left and right sides of the connecting seat 1. The kneading shaft 32 is connected to the first connecting member 29. The rotation axis of the kneading shaft 32 and the supporting seat assembly 20 form an inclined angle A, and the rotation axis of the kneading shaft 32 and the first connecting member 29 form the same inclined angle B. The inclined angle A and the inclined angle B are equal in value. The first driving assembly 31 is configured to drive the kneading shaft 32 to rotate so as to drive the first connecting member 29 and the connecting shaft 23 to reciprocate on the supporting seat assembly 20, such that the upper massage arm 21 rotates with respect to the supporting seat assembly 20 with the axis that perpendicularly passes through the point A on the supporting seat assembly 20 as the rotation axis, and the lower massage arm 22 rotates with respect to the supporting seat assembly 20 with the axis that perpendicularly passes through the point B on the supporting seat assembly 20 as the rotation axis. The points A and B are respectively located on both sides of the connecting shaft 23, so that the upper massage rolling wheel 211 and the lower massage rolling wheel 221 move close to or far away from each other to realize the shoulder-clamping action. In the meantime, the two upper massage arms 21 and the upper massage rolling wheel 211 are simultaneously driven to move close to or away from each other, and the two lower massage arms 22 and the lower massage rolling wheel 221 are driven to move close to or away from each other to realize the kneading action. That is, by simply rotating the single kneading shaft 32, the shoulder-clamping and kneading actions of the massage mechanism can be completed synchronously. The structure is simple, thereby reducing the size of the entire mechanism.

Figure 4:
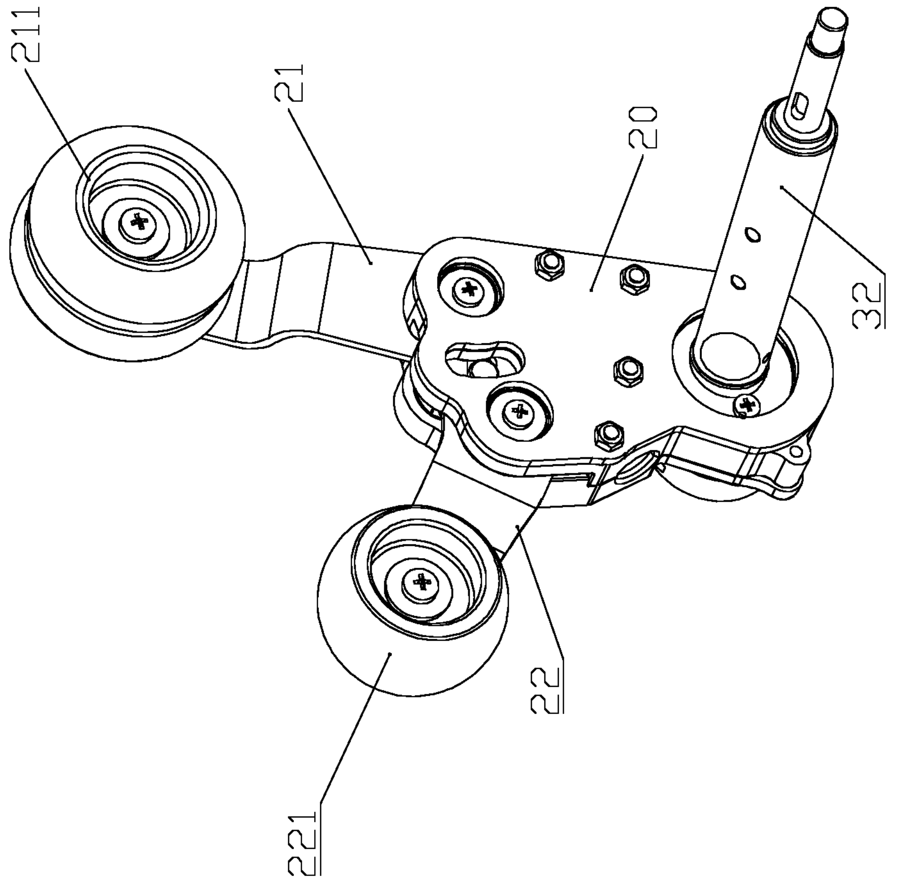
FIG. 4 is a second schematic structural view of a clamping and kneading massage mechanism of the disclosure (the first driving assembly is omitted).
Figure 5:
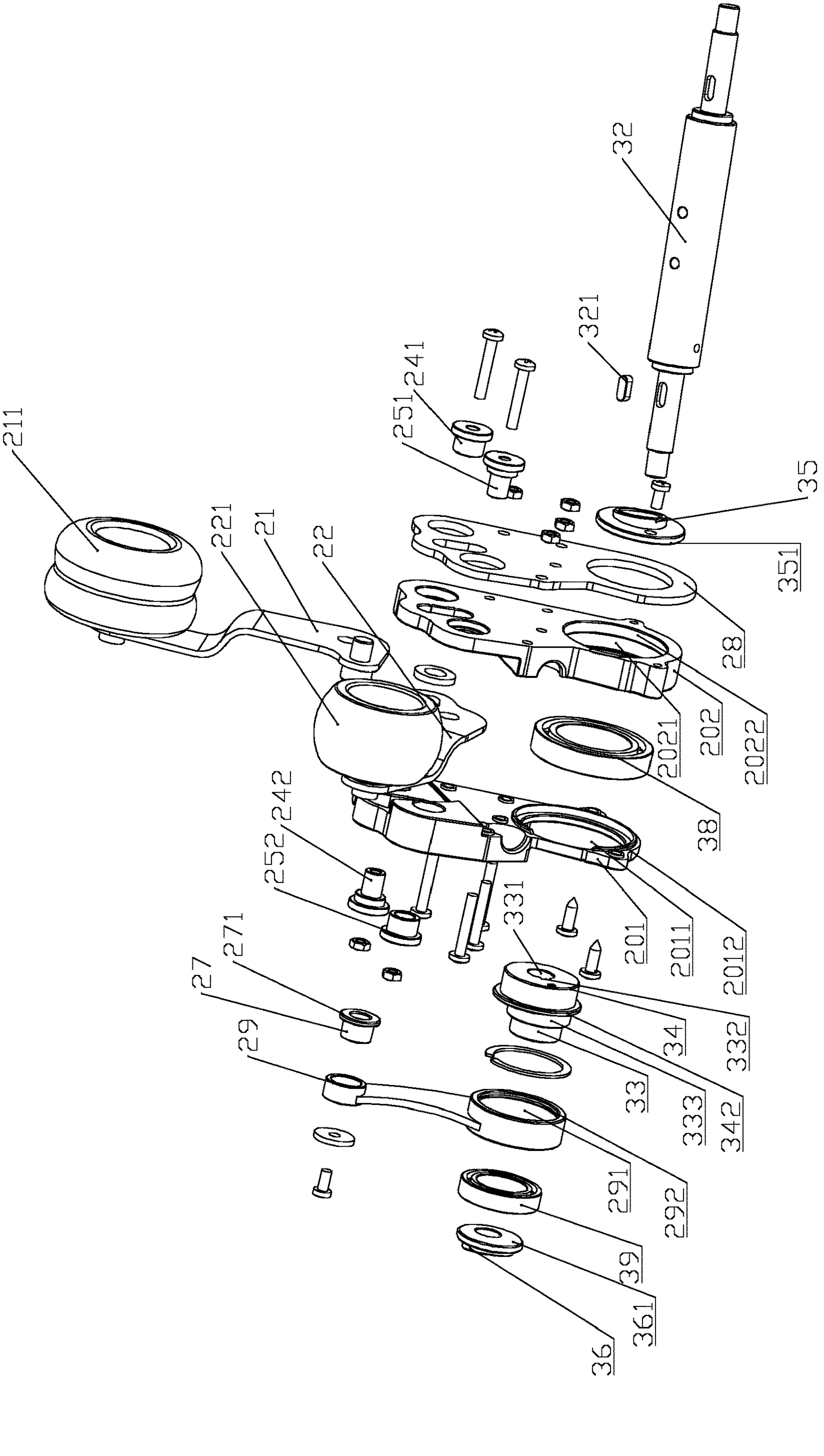
FIG. 5 is an exploded schematic view of FIG. 4.

As shown in FIG. 4 and FIG. 5, the kneading shaft 32 includes a left section, a middle section, and a right section. The left section and the right section of the kneading shaft 32 are sleeved with an integrally formed or separated first sleeve 33 and the second sleeve 34. The first sleeve 33 and the second sleeve 34 have different axes. The supporting seat assembly 20 is sleeved on the first sleeve 33. The supporting seat assembly 20 and rotation axis of the kneading shaft 32 form an inclined angle A. The first connecting member 29 is sleeved on the second sleeve 34, the first connecting member 29 and the rotation axis of the kneading shaft 32 form an inclined angle B. The inclined angle A and the inclined angle B are equal in value. The first driving assembly 31 drives the kneading shaft 32 to rotate to complete the shoulder-clamping action and the kneading action simultaneously. In this embodiment, through clever design of different axes of the first sleeve 33 and the second sleeve 34 as well as the inclined angle A and inclined angle B having the same value between the first sleeve 33 and the second sleeve 34 and the rotation axis of the kneading shaft 32, the horizontal movements of the connecting member 29 and the supporting seat assembly 20 are synchronized, while their vertical movements are different. In this way, by simply rotating the single kneading shaft 32, it is possible to simultaneously complete the shoulder-clamping and kneading actions of the massage mechanism.

In order to connect the supporting seat assembly 20 with the first sleeve 33, to make the supporting seat assembly 20 and the rotation axis of the kneading shaft 32 to form an inclined angle A, to connect the first connecting member 29 with the second sleeve 34, and to make the first connecting member 29 and the rotation axis of the kneading shaft 32 to form an inclined angle B, there are the following embodiments.

In the first embodiment, the left section, the middle section and the right section of the kneading shaft 32 are coaxially distributed. The first sleeve 33 is provided with a fifth mounting hole 331, and the axis of the fifth mounting hole 331 and the axis of the first sleeve 33 form an inclined angle C. The inclined angle A and the inclined angle C are equal in value. As such, the supporting seat assembly 20 and the rotation axis of the kneading shaft 32 form an inclined angle A. The second sleeve 34 is provided with a sixth mounting hole. The axis of the sixth mounting hole and the axis of the second sleeve 34 form an inclined angle D. As such, the first connecting member 29 and the rotation axis of the kneading shaft 32 form an inclined angle B. The inclined angle D and the inclined angle B are equal in value.

In the second embodiment, the axis of the left section of the kneading shaft 32 and the axis of the middle section of the kneading shaft 32 form an inclined angle E. The axis of the right section of the kneading shaft 32 and the axis of the middle section of the kneading shaft 32 form an inclined angle F. The inclined angle E and the inclined angle F are equal in value to the inclined angle A and the inclined angle B. The supporting seat assembly 20 is connected to the first sleeve 33, so that the supporting seat assembly 20 and the axis of the middle section of the kneading shaft 32 form an inclined angle A. The first connecting member 29 is connected to the second sleeve 34, so that the first connecting member 29 and the axis of the middle section of the kneading shaft 32 form an inclined angle B.

In the third embodiment, the axis of the left section of the kneading shaft 32 and the axis of the middle section of the kneading shaft 32 form an inclined angle G. The axis of the right section of the kneading shaft 32 and the axis of the middle section of the kneading shaft 32 form an inclined angle H. The inclined angle G and the inclined angle H are different in value from the inclined angle A and the inclined angle B. The axis of the fifth mounting hole 331 and the axis of the first sleeve 33 form an inclined angle I, and the inclined angle I is different from the inclined angle A in value. However, the configuration that the supporting seat assembly 20 is sleeved on the first sleeve 33 can make the supporting seat assembly 20 and the axis of the middle section of the kneading shaft 32 to form an inclined angle J. The inclined angle J is different from the inclined angle B in value. However, the configuration that the first connecting member 29 is sleeved on the second sleeve 34 can make the first connecting member 29 and the axis of the middle section of the kneading shaft 32 to form an inclined angle B.

In order for the first connecting member 29 to be firmly connected to the second sleeve 34 and the supporting seat assembly 20 to be firmly connected to the first sleeve 33, a first bearing 38 and a second bearing 39 are further provided. The first bearing 38 is sleeved on the first sleeve 33, and the supporting seat assembly 20 is connected to the first sleeve 33 through the first bearing 38. The second bearing 39 is sleeved on the second sleeve 34, and the first connecting member 29 is connected to the second sleeve 34 through the second bearing 39.

In order to for the first sleeve 33 and the second sleeve 34 to be firmly arranged on the left and right sections of the kneading shaft 32, both the left and right sections of the kneading shaft 32 are sleeved with a third sleeve 35 and a second sleeve. The diameters of the left and right sections of the kneading shaft 32 are smaller than the diameter of the middle section of the kneading shaft 32, and the shaft ends of the left and right sections of the kneading shaft 32 are threadedly connected to a first threaded member. One end surface of the third sleeve 35 is close to the middle section of the kneading shaft 32 and the other end surface of the third sleeve 35 is close to the inner ring of the first bearing 38. One end surface of the fourth sleeve 36 is close to the first threaded member, and the other end surface of the fourth sleeve 36 is close to the inner ring of the second bearing 39. More preferably, the first sleeve 33 or the second sleeve 34 is provided with a first key groove 332, and the left and right sections of the kneading shaft 32 are provided with a first metal key 321 corresponding to the first key groove 332. Through the cooperation of the first key groove 332 and the first metal key 321, the first bearing 33 and the second bearing 34 are non-rotatably mounted on the left and right sections of the kneading shaft 32. More preferably, the third sleeve 35 is fixed to the first sleeve 33 through a pin hole and a fixing pin, and the fourth sleeve 36 is fixed to the second sleeve 34 through a pin hole and a fixing pin.

It should be noted that when the first sleeve 33 and the second sleeve 34 are separate parts, the first sleeve 33 and the second sleeve 34 are both provided with key grooves. The left section and the right section of the kneading shaft 32 are provided with metal keys corresponding to the key groove. Through the cooperation of the key groove and the metal keys, the first sleeve 33 and the second sleeve 34 are non-rotatably mounted on the left section and right section of the kneading shaft 32.

Specifically, the third sleeve 35 is provided with a third flange 351, the fourth sleeve 36 is provided with a fourth flange 361, and the first sleeve 33 is provided with a fifth flange 333. The second sleeve 34 is provided with a sixth flange 342, and the fifth flange 333 is close to the sixth flange 342. The first bearing 38 is sleeved on the first sleeve 33, and has two end surfaces on both sides respectively close to the third flange 351 and the fifth flange 333. The supporting seat assembly 20 is connected to the first sleeve 33 through the first bearing 38. The second bearing 39 is sleeved on the second sleeve 34, and has two end surfaces on both sides respectively close to the fourth flange 361 and the six flange 342. The first connecting member 29 is connected to the second sleeve 34 through the second bearing 39. As such, this arrangement can prevent the second bearing 39 and the second sleeve 34 from sliding relative to each other.

Specifically, the first plate 201 is provided with a seventh mounting hole 2011, the second plate 202 is provided with an eighth mounting hole 2021, the seventh mounting hole 2011 is provided with a seventh flange 2012, and the eighth mounting hole 2021 is provided an eighth flange 2022. The first bearing 38 is lodged in the seventh mounting hole 2011 and the eighth mounting hole 2021 through the seventh flange 2012 and the eighth flange 2022. As such, this arrangement can prevent the supporting seat assembly 20 and the first bearing 38 from sliding relative to each other.

Specifically, the lower end of the first connecting member 29 is provided with a ninth mounting hole 291. The ninth mounting hole 291 is provided with a ninth flange 292. The inner surface of the ninth mounting hole 291 is provided with an annular groove, and an engagement ring is provided in the annular groove. The second bearing 39 is lodged in the ninth mounting hole 291 through the ninth flange 292 and the engagement ring. In this way, this arrangement can prevent the first connecting member 29 and the second bearing 39 from sliding relative to each other.

Figure 8:
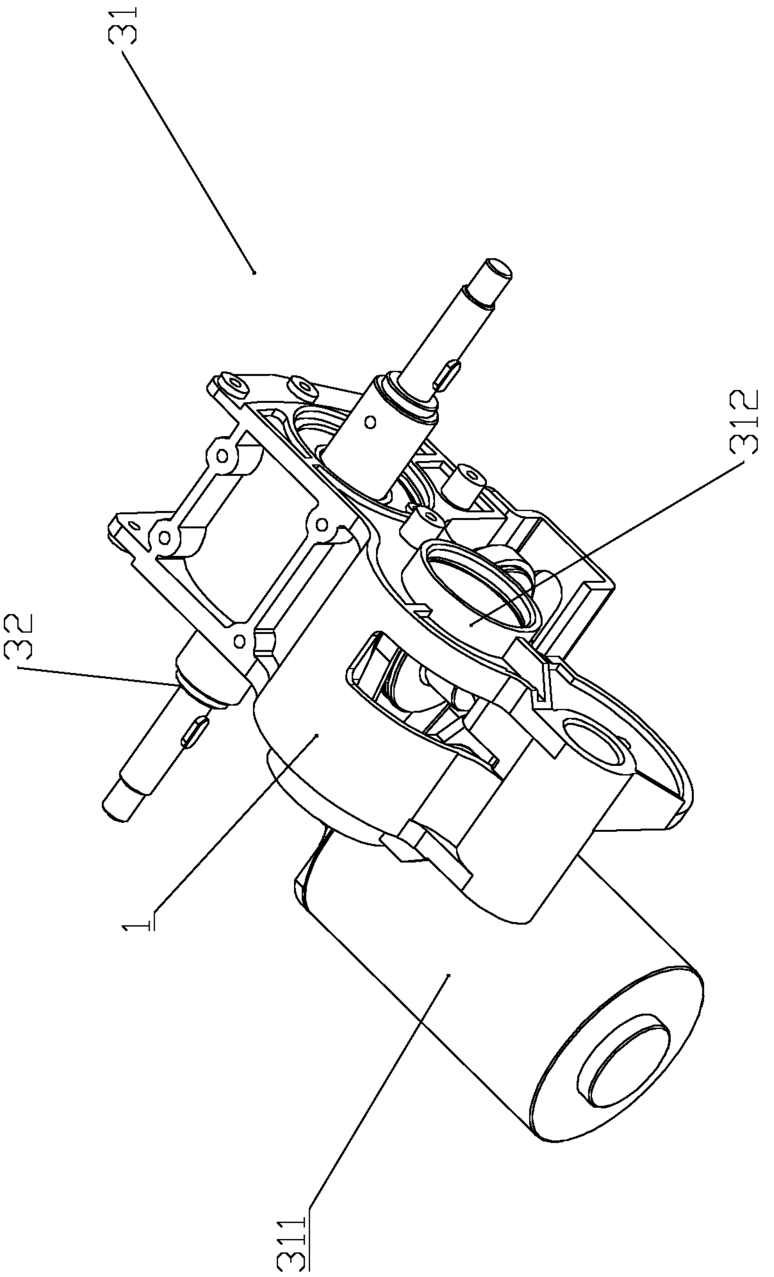
FIG. 8 is a schematic structural view of the first driving assembly of the disclosure.
Figure 9:
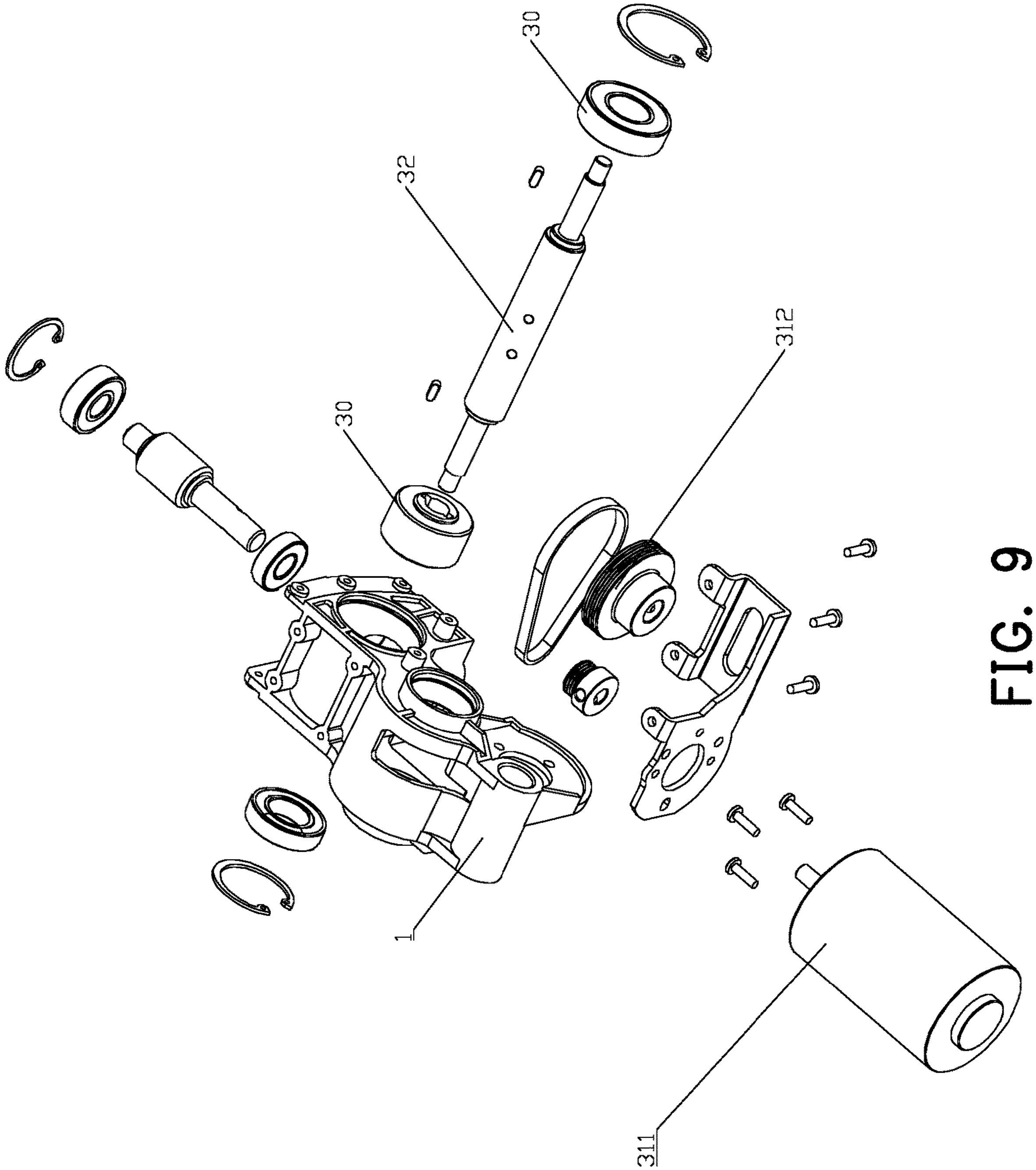
FIG. 9 is an exploded schematic view of FIG. 8.

The first driving assembly 31 shown in FIG. 8 and FIG. 9 includes a kneading motor 311 and a first decelerator 312 mounted on the connecting seat 1. The kneading motor 311 is fixed under the connecting seat 1 through a first motor fixing plate. The first decelerator 312 includes a large kneading pulley, a first belt, and a kneading worm screw. The kneading motor 311 decelerates and drives the large pulley through the first belt, and the large pulley is fixed on the kneading worm screw. The kneading worm screw and the kneading shaft 32 realize a two-stage deceleration transmission, that is, the first decelerator 312 is a two-stage decelerator, which realizes a two-stage deceleration transmission. More preferably, in order for the kneading shaft 32 to be more firmly rotated in the connecting seat 1, two third bearings 30 are further provided between the kneading shaft 32 and the connecting seat 1. The two third bearings 30 are separated by a certain distance. The kneading motor 311 drives the kneading shaft 32 to rotate through the first decelerator 312, so that the upper massage arm 21 and the lower massage arm 22 move close to or away from each other, and the upper massage rolling wheel 211 and the lower massage rolling wheel 221 move close to or away from each other to realize the shoulder-clamping action. In the meantime, the two upper massage arms 21 and the upper massage rolling wheel 211 are driven simultaneously to move close to or away from each other, and the two lower massage arms 22 and the lower massage rolling wheel 221 are driven to move close to or away from each other to achieve a kneading action.

It should be noted that in the process of completing the kneading action, the upper massage arm 21 and the lower massage arm 22 will exert a greater force in horizontal direction on the first plate 201 and the second plate 202. However, because of the configuration of the reinforcing plate 28 fixed on the second plate 202, the force can be cancelled to a large extent, thus preventing the first plate 201 and the second plate 202 from separating.

The assembly process of the clamping and kneading massage mechanism is as follows.

1) The assembly process is the same as the assembly process of the shoulder-clamping massage mechanism. However, in the assembly step 4) of the shoulder-clamping massage mechanism, the first bearing 38 needs to be arranged in the seventh mounting hole 2011 and the eighth mounting hole 2021.

2) The kneading shaft 32 and the first decelerator 312 are mounted on the connecting seat 1.

3) The second bearing 39 is placed into the ninth mounting hole 291, and then the engagement ring is lodged into the annular groove of the ninth mounting hole 291.

4) The third sleeve 35 is sleeved on the left section of the kneading shaft 32, and the shoulder-clamping massage mechanism equipped with the first bearing 38 is sleeved on the first sleeve 33, then the first sleeve 33 is sleeved on the left section of the kneading shaft 32. In this embodiment, the second sleeve 34 and the first sleeve 33 are integrally formed, that is, the second sleeve 34 has been sleeved on the left section of the kneading shaft 32, and the first connecting member 29 equipped with the second bearing 39 is sleeved on the second sleeve 34, then the fourth sleeve 36 is sleeved on the left section of the kneading shaft 32, and then the nut at the shaft end of the left section of the kneading shaft 32 is tightened.

5) The third sleeve 35 is sleeved on the right section of the kneading shaft 32, and the shoulder-clamping massage mechanism equipped with the first bearing 38 is sleeved on the first sleeve 33, then the first sleeve 33 is sleeved on the right section of the kneading shaft 32. In this embodiment, the second sleeve 34 and the first sleeve 33 are integrally formed, that is, the second sleeve 34 has been sleeved on the right section of the kneading shaft 32. Then, the first connecting member 29 equipped with the second bearing 39 is sleeved on the second sleeve 34, and the fourth sleeve 36 is sleeved on the right section of the kneading shaft 32, and then the nut at the shaft end of the right section of the kneading shaft 32 is tightened.

It should be noted that the assembling step 4) and step 5) of the above-mentioned clamping and kneading massage mechanism are in no particular order.

A massage armchair includes a seat part, a backrest part connected to the seat part, and a support part for supporting the seat part. The backrest part is equipped with the above-mentioned clamping and kneading massage mechanism.

A massage method for a massage armchair performs shoulder-clamping massage while performing kneading massage.

The kneading massage refers to the action of the two upper massage rolling wheels 211 distributed on the left and right and the two lower massage rolling wheels 221 distributed on the left and right moving close to or away from each other while swinging.

The shoulder-clamping massage refers to the action of the upper massage rolling wheel 211 and the lower massage rolling wheel 221 distributed at the front and back moving close to or away from each other.

Specifically, the specific process of the kneading massage is as follows. The first driving assembly 31 drives the kneading shaft 32 to rotate. Two first sleeves 33 sleeved on the left and right ends of the kneading shaft 32 are driven to rotate. Then, two first bearings 38 respectively sleeved on the outer rings of the two first sleeves 33 are driven to perform eccentric rotation with swing. Then, two supporting seat assemblies 20 respectively sleeved on the outer rings of the two first bearings 38 are driven to move close to or away from each other while swinging. Then, two upper massage arms 21 respectively arranged on the two supporting seat assemblies 20 are driven to move close to or away from each other while swinging. Then, two lower massage arms 22 respectively arranged on the two supporting seat assemblies 20 are driven to move close to or away from each other while swinging. Then, two upper massage rolling wheels 211 respectively arranged on the two upper massage arms 21 are driven to move close to or away from each other while swinging. Then, two lower massage rolling wheels 221 respectively arranged on the two lower massage arms 22 are driven to move close to or away from each other while swinging. Specifically, the specific process of the shoulder-clamping massage is: the first driving assembly 31 drives the kneading shaft 32 to rotate. Then, two second sleeves 34 sleeved on the left and right ends of the kneading shaft 32 are driven to rotate. Then, the second bearing 39 sleeved on the outer ring of the second sleeve 34 is driven to perform eccentric rotation with swing. Then, the first connecting member 29 sleeved on the outer ring of the second bearing 39 is driven to reciprocate up and down. Then, the connecting shaft 23 connected to the first connecting member 29 is driven to reciprocate up and down. Then, the upper massage arm 21 and the lower massage arm 22, which are rotatably connected to the connecting shaft 23, are driven to move close to or away from each other during rotation. Then, the upper massage rolling wheel 211 and the lower massage rolling wheel 221 are driven to complete the action of moving close to or away from each other once.

Specifically, the first bearing 38 is sleeved on a first outer side wall of the first sleeve 33, the second bearing 39 is sleeved on the second outer side wall of the second sleeve 34. As shown in FIG. 16, the first outer side wall and the rotation axis 62 of the kneading shaft 32 form an inclined angle A. The second outer side wall and the rotation axis 62 of the kneading axis 32 form an inclined angle B. The inclined angle A and the inclined angle B are equal in value.

Specifically, the axis of the second outer side wall is located right below the axis of the first outer side wall. The first driving assembly 31 drives the kneading shaft 32 to rotate half a turn. When the two upper massage rolling wheels 211 move to change a distance therebetween from the largest separation distance to the smallest separation distance and the two lower massage rolling wheels 211 move to change a distance therebetween from the largest separation distance to the smallest separation distance, the upper massage rolling wheel 211 and the lower massage rolling wheel 221 move to change a distance therebetween from the smallest separation distance to the largest separation distance.

Specifically, the axis of the second outer side wall is located right above the axis of the first outer side wall. The first driving assembly 31 drives the kneading shaft 32 to rotate half a turn. When the two upper massage rolling wheels 211 move to change a distance therebetween from the largest separation distance to the smallest separation distance and the two lower massage rolling wheels 221 move to change a distance therebetween from the largest separation distance to the smallest separation distance, the upper massage rolling wheel 211 and the lower massage rolling wheel 221 move to change a distance therebetween from the largest separation distance to the smallest separation distance.

Specifically, the axis of the second outer side wall and the axis of the first outer side wall are not on the same vertical plane. The first driving assembly 31 drives the kneading shaft 32 to rotate half a turn. When the two upper massage rolling wheels 211 move to change a distance therebetween from the largest separation distance to the smallest separation distance and the two lower massage rolling wheels 211 move to change a distance therebetween from the largest separation distance to the smallest separation distance, the upper massage rolling wheel 211 and the lower massage rolling wheel 221 are in the process of moving to change the largest separation distance to the smallest separation distance or moving to change the smallest separation distance to the largest separation distance.

Specifically, the first sleeve 33 and the second sleeve 34 are integrally formed or fixedly connected.

Specifically, the first driving assembly 31 includes a kneading motor 311 and a first decelerator 312, and the kneading motor 311 decelerates and drives the kneading shaft 32 to rotate through the first decelerator 312.

Figure 13:
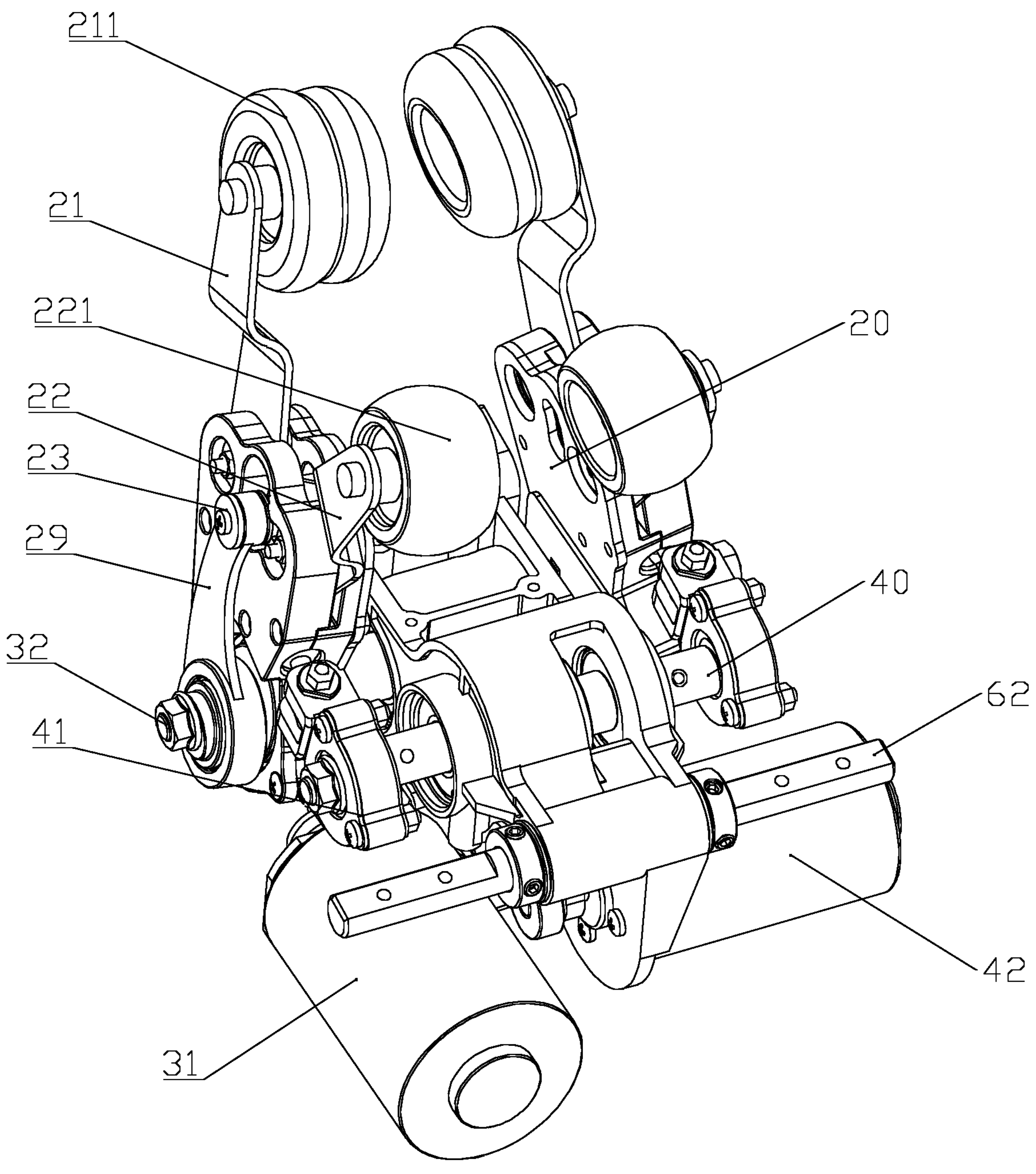
FIG. 13 is a first use state diagram of the clamping and kneading massage mechanism of the disclosure (the upper and lower massage arms are in the narrowest state).
Figure 14:
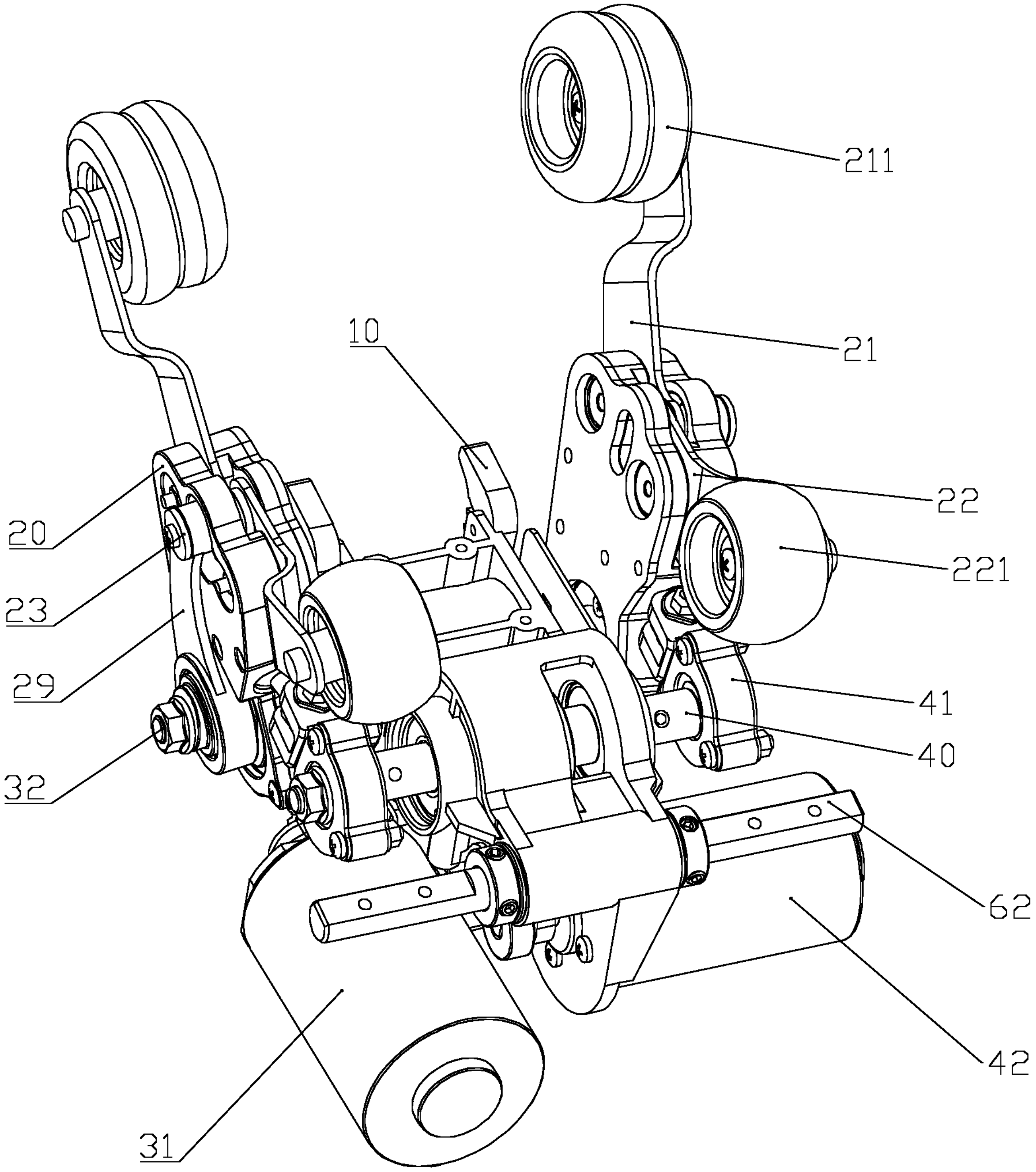
FIG. 14 is a second use state diagram of the clamping and kneading massage mechanism of the disclosure (the upper and lower massage arms are in the widest state).

It should be noted that although the shoulder-clamping and kneading actions of the massage mechanism can be completed through only one kneading shaft 32 in the embodiment of the disclosure, it is still possible to adjust the deflection distance between and deflection direction of the axis of the first sleeve 33 and the axis of the second sleeve 34, so that there is a difference between the shoulder-clamping action and the kneading action in the massage process. In this embodiment, when the first driving assembly 31 drives the kneading shaft 32 to rotate, and the clamping and kneading massage mechanism in the use state as shown in FIG. 14 is changed to the clamping and kneading massage mechanism in the use state as shown in FIG. 13, that is, when the first sleeve 33 rotates from the lowest point to the highest point, and the second sleeve 34 rotates from the highest point to the lowest point, under the circumstances, the kneading action and the shoulder-clamping action are completed simultaneously.

Of course, it is also possible to adjust the deflection of between the axis of the first sleeve 33 and the axis of the second sleeve 34, so that when the first sleeve 33 rotates from the lowest point to the highest point, and the second sleeve 34 rotates from the lowest point to the highest point, under the circumstances, the kneading action is completed, but the shoulder-clamping action has just begun.

It is also possible to adjust the deflection direction of the axis of the first sleeve 33 and the axis of the second sleeve 34, so that when the first sleeve 33 rotates from the lowest point to the highest point, and the second sleeve 34 rotates half a turn, under the circumstances, the kneading action is completed, but the shoulder-clamping action is in progress.

Third Embodiment

In this embodiment, the shoulder-clamping and kneading massage mechanism described in the second embodiment cooperates with the percussion shaft 40 to form a clamping-kneading-percussion massage mechanism as shown in FIG. 3. In this manner, other than the existing massage motion, the shoulder-clamping and kneading massage mechanism can further integrate the percussion massage technique to realize the combination of different massage techniques.

Figure 2:
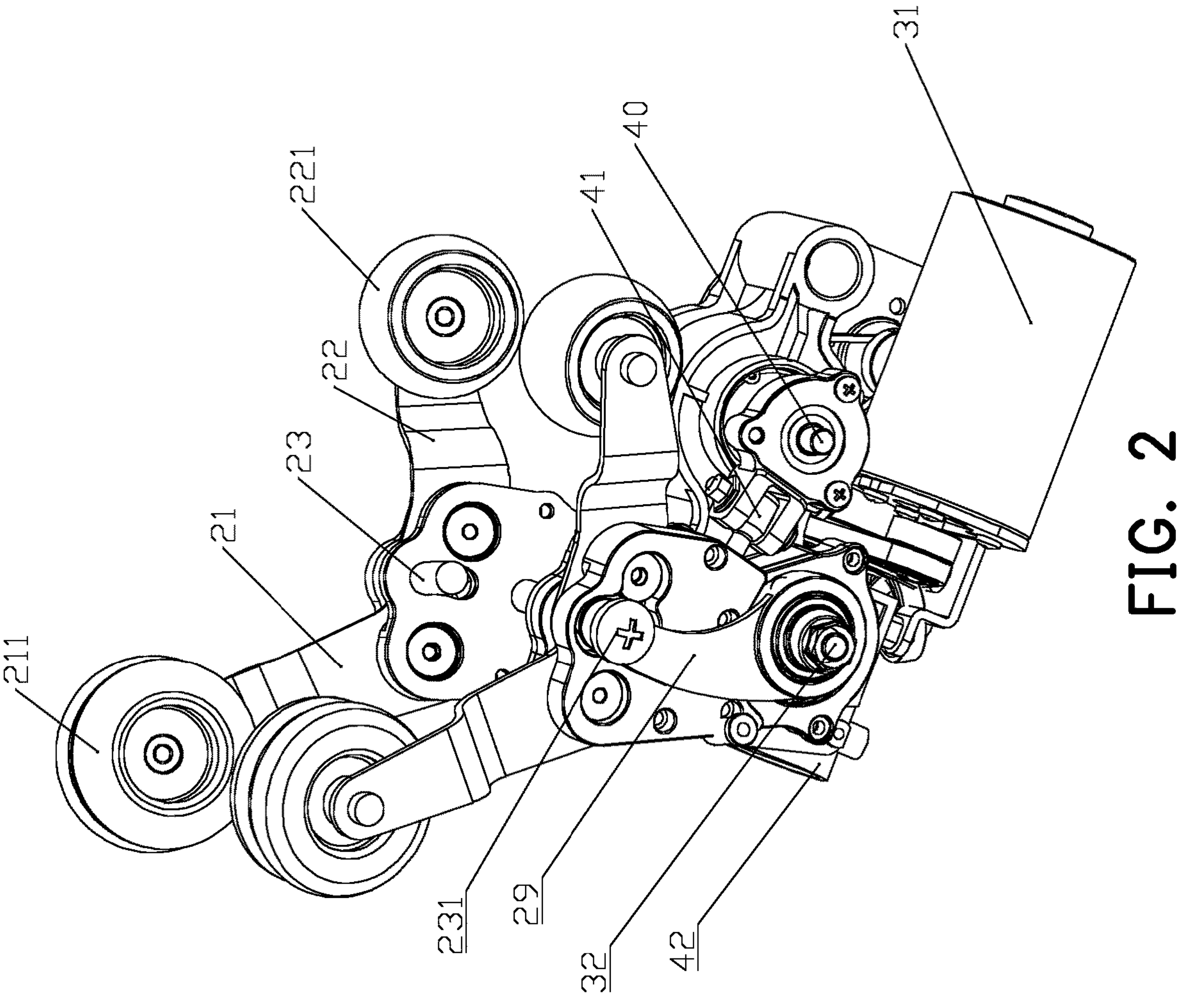
FIG. 2 is a schematic structural view of a clamping, kneading and percussion massage mechanism of the disclosure.

A clamping and kneading massage mechanism as shown in FIG. 2 includes the clamping and kneading massage mechanism as described in the second embodiment, and further includes a percussion shaft 40 arranged on the connecting seat 1, a percussion assembly 41, and a second driving assembly 42. The percussion shaft 40 is distributed parallel to the kneading shaft 32, and is spaced from the kneading shaft 32 at a certain distance, so that at least the shaft end of the kneading shaft 32 does not pass through the area where the supporting seat assembly 20 is located. One end of the percussion assembly 41 is connected to the supporting seat assembly 20, and the other end of the percussion assembly 41 is sleeved on the percussion shaft 40. The second driving assembly 42 drives the percussion shaft 40 to rotate to drive the percussion assembly 41 to reciprocate, so that the upper massage arm 21 and the lower massage arm 22 swing back and forth to achieve percussion action.

Specifically, the percussion shaft 40 includes a left section of the percussion shaft 40, a middle section of the percussion shaft 40, and a right section of the percussion shaft 40. The left section of the percussion shaft 40 and the middle section of the percussion shaft 40 have different axes. The right section of the percussion shaft 40 and the middle section of the percussion shaft 40 have different axes. The second driving assembly 42 drives the middle section of the percussion shaft 40 to rotate to drive the percussion assembly 41 to reciprocate, so that the upper massage arm 21 and the lower massager arm 22 swings back and forth to complete the percussion action. When the left section of the percussion shaft 40 is coaxial with the right section of the percussion shaft 40, the shoulder-clamping massage mechanisms located on the left and right sides of the connecting seat 1 performs synchronized percussion action. When the left section of the percussion shaft 40 and the right section of the percussion shaft 40 are axially different, the shoulder-clamping massage mechanisms located on the left and right sides of the connecting seat 1 perform asynchronized percussion action. More preferably, the axis of the end shaft at both ends of the percussion shafts 40 deviates from the axis of the middle section of the percussion shaft 40 in an opposite direction with the same distance. As such, it is possible to realize asynchronized percussion action performed by two shoulder-clamping massage mechanisms, while enabling the two shoulder-clamping massage mechanisms to perform percussion action alternately at the same time interval, which is more similar to the conventional massage technique.

Specifically, the percussion assembly 41 includes a fifth bearing 411, a first bearing seat 412, and a ball joint rod 413. The fifth bearing 411 is sleeved on the left and right sections of the percussion shaft 40. A tenth mounting hole 4121 is provided on the first bearing seat 412, a tenth flange 4122 is provided on the tenth mounting hole 4121, and the fifth bearing 411 is mounted in the tenth mounting hole 4121. The tenth flange 4122 blocks the fifth bearing 411 from sliding in the direction of the tenth flange 4122. The first bearing seat 412 is further provided with a second engagement ring, and the second engagement ring is fixed on the other surface of the first bearing seat 412 by screws, and configured to prevent the fifth bearing 411 from sliding in the direction opposite to the tenth flange 4122. One end of the ball joint rod 413 is sleeved on the threaded member on the first bearing seat 412, and the other end of the ball joint rod 413 is a universal ball joint structure. The first plate 201 and the second plate 202 form a cavity A204 during the fixing and connection process. The universal ball joint structure is located in the cavity A204, so that one end of the ball joint rod 413 with universal ball joint is movably connected to the supporting seat assembly 20.

Figure 10:
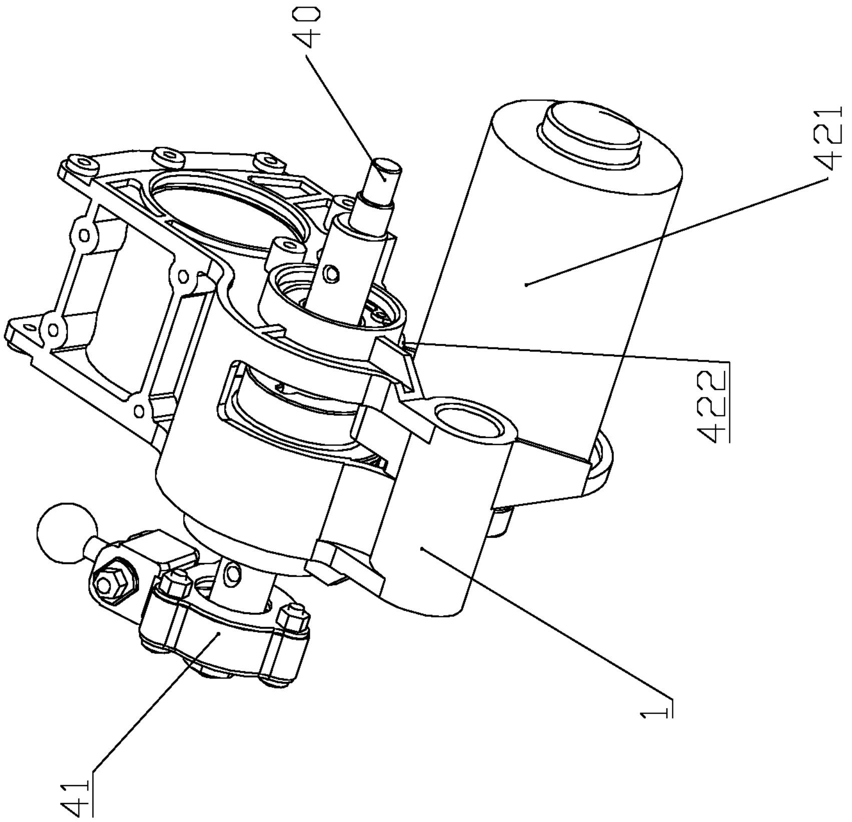
FIG. 10 is a schematic structural view of the second driving assembly of the disclosure.
Figure 11:
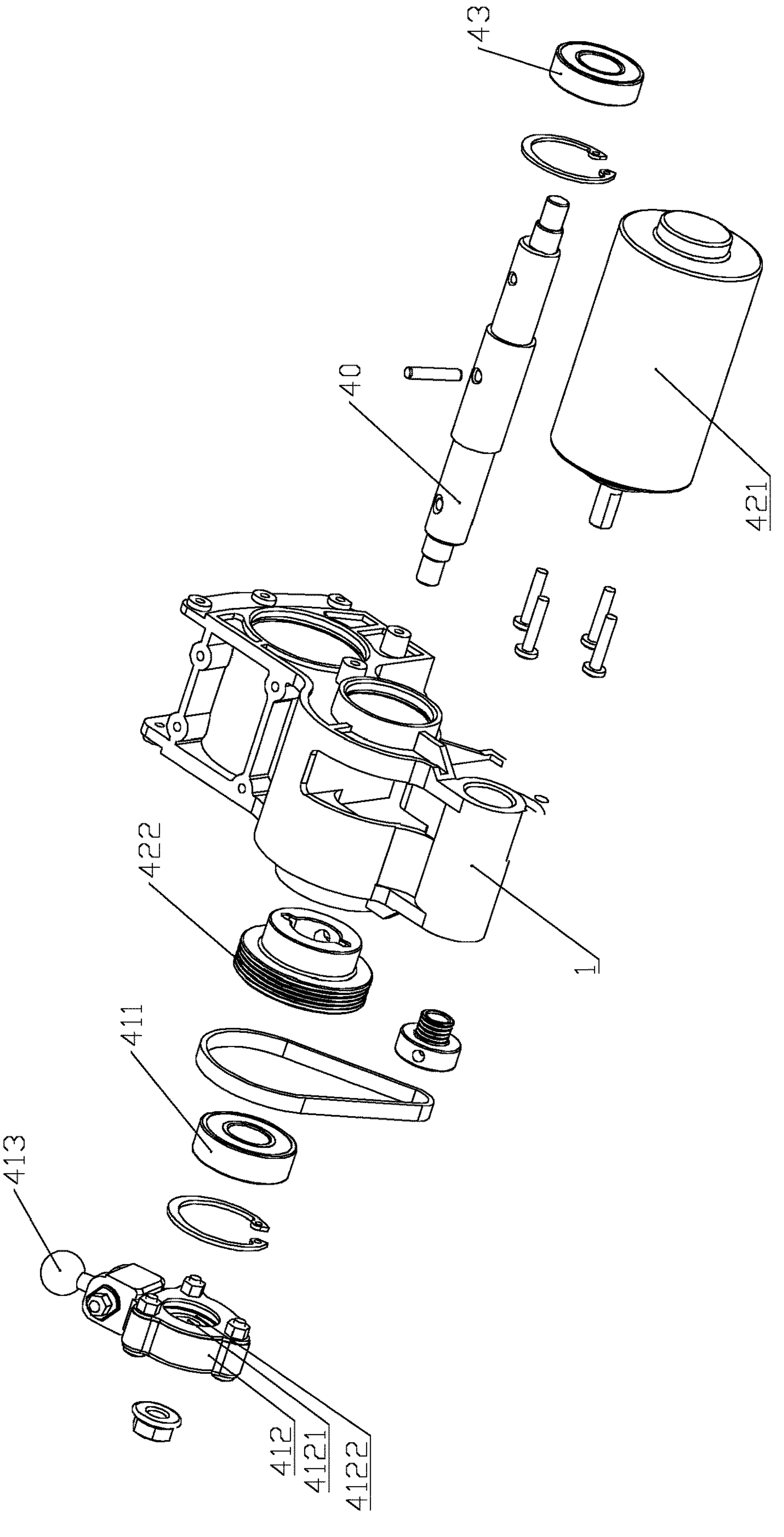
FIG. 11 is an exploded schematic view of FIG. 10.

As shown in FIG. 10 and FIG. 11, the second driving assembly 42 includes a percussion motor 421 and a second decelerator 422 arranged on the connecting seat 1. The percussion motor 421 is fixed below the connecting seat 1 through a second motor fixing plate. The second decelerator 422 includes a large percussion pulley and a second belt. The percussion motor 421 decelerates and drives the large pulley through the second belt. The large pulley is fixed on the percussion shaft 40. More preferably, In order to make the percussion shaft 40 rotate more stably in the connecting seat 1, two fourth bearings 43 are further provided between the percussion shaft 40 and the connecting seat 1, and the two fourth bearings 43 are separated by a certain distance. The percussion motor 421 drives the middle section of the percussion shaft 40 to rotate through the second decelerator 422 to drive the ball joint rod 413 to reciprocate, so that the upper massage arm 21 and the lower massage arm 22 swing back and forth to complete the percussion action.

The assembly process of the clamping, kneading and percussion massage mechanism is as follows.

1) The percussion shaft 40, the fourth bearing 43 and the second decelerator 422 are mounted on the connecting seat 1.

2) Two fifth bearings 411 are placed into two first bearing seats 412 respectively. Then the two first bearing seats 412 are respectively arranged on the left section of the percussion shaft 40 and the right section of the percussion shaft 40, respectively. Then the threaded member passes through the upper surface of the first bearing seat 412, one end of the ball joint rod 413 and the lower surface of the first bearing seat 412 in sequence, thereby completing the fixation of the threaded member and the first bearing seat 412.

3) The assembly process is the same as the assembly process of the clamping and kneading massage mechanism. However, in the assembly step 1) of the clamping and kneading massage mechanism, that is, during the assembly process of the first plate 201 and the second plate 202, it is necessary to place the universal ball joint structure of the ball joint rod 413 into the cavity A204 first, then the first plate 201 and the second plate 202 are fixed.

A massage armchair includes a seat part, a backrest part connected to the seat part, and a support part for supporting the seat part. The backrest part is provided with the above-mentioned clamping and kneading massage mechanism.

Fourth Embodiment

In this embodiment, the clamping, kneading and percussion massage mechanism described in the third embodiment cooperates with the moving frame 50, the third driving assembly 60 and the fourth driving assembly 51 to form a complete massage mechanism as shown in FIG. 1. The massage mechanism can complete the three massage actions of shoulder-clamping, kneading and percussion, and can further adjust the massage strength and massage position. The massage mechanism has a simple structure and small size.

A massage mechanism as shown in FIG. 1 includes the clamping, kneading and percussion massage mechanism as described in the third embodiment, and further includes a moving frame 50, and a third driving assembly 60 and a fourth driving assembly 51 mounted on the moving frame 50. The third driving assembly 60 is configured to drive the connecting seat 1 to swing, thereby adjusting the massage strength; the fourth driving assembly 51 is configured to drive the moving frame 50 to move, thereby adjusting the massage position.

Figure 12:
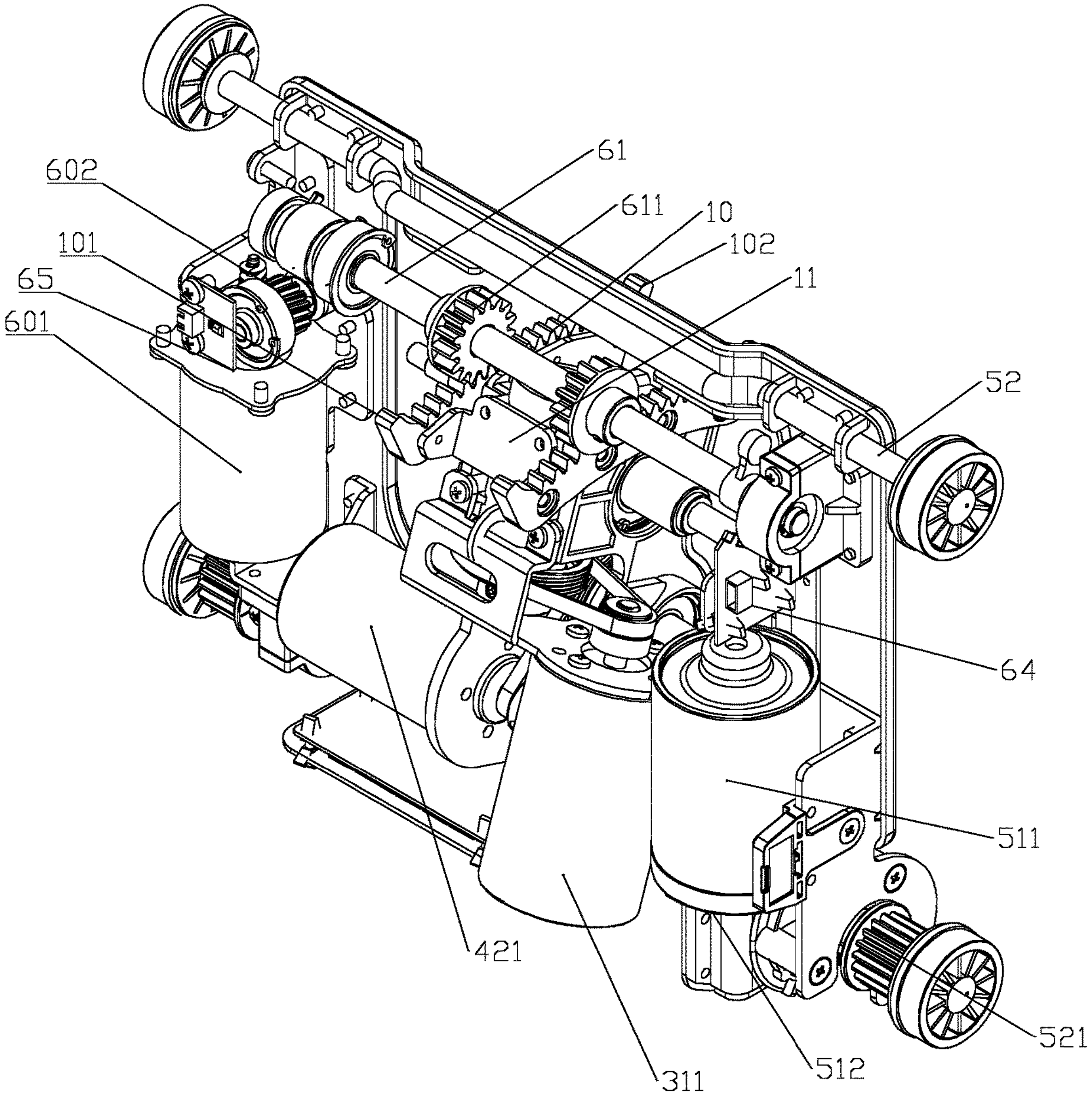
FIG. 12 is a schematic structural view of the massage mechanism of the disclosure (without the clamping, kneading and percussion massage mechanism).

As shown in FIG. 12, the third driving assembly 60 includes a pushing motor 601, a third decelerator 602, and a pushing shaft 61 mounted on the moving frame 50. The pushing motor 601 decelerates and drives the pushing shaft 61 through the third decelerator 602, so that the connecting seat 1 swings. More preferably, a rotating shaft 62 is further provided. The two ends of the rotating shaft 62 are mounted on the moving frame 50 and pass through the rear of the connecting seat 1. The front part of the connecting seat 1 is further provided with two arc-shaped racks 10. The pushing shaft 61 is further provided with a pushing gear 611 meshing and driving with the arc-shaped rack 10. The pushing motor 601 decelerates and drives the pushing shaft 61 through the third decelerator 602. The rotation of the pushing shaft 61 causes the pushing gear 611 to rotate, so that the arc-shaped rack 10 makes the connecting seat 1 swing back and forth with the rotating shaft 62 as an axis.

Specifically, the arc-shaped rack 10 is fixedly connected to the connecting seat 1 through a threaded member. The top end of the arc-shaped rack 10 is provided with a first protrusion 101, and the bottom end of the arc-shaped rack 10 is provided with a second protrusions 102. The first protrusion 101 and the second protrusion 102 are configured to limit the swing range of the connecting seat 1. More preferably, a rack support frame 11 is further provided, and the bottom end of the rack support frame 11 is fixed on the connecting seat 1, and the two ends thereof are respectively fixed with two arc-shaped racks 10, so as to prevent the arc-shaped rack 10 from shaking left and right.

Specifically, in order to make the rotating shaft 62 rotate more stably in the connecting seat 1, two sixth bearings 63 are further provided between the rotating shaft 62 and the connecting seat 1, and the two sixth bearings 63 are separated by a certain distance.

Specifically, the third decelerator 602 includes a third housing fixed on the moving frame 50, and a pushing worm screw mounted inside the third housing. Two large and small gears are provided on the pushing worm screw. One gear meshes and drives with the output shaft of the pushing motor 601, and the other gear meshes and drives with the pushing shaft 61. Through such configuration, the third decelerator 602 can realize the two-stage transmission deceleration of worm gear, and a large transmission ratio can be obtained. Moreover, the structure is compact and the overall size is small. The pushing motor 601 decelerates and drives the pushing shaft 61 through the third decelerator 602. The rotation of the pushing shaft 61 causes the pushing gear 611 to rotate, so that the arc-shaped rack 10 makes the connecting seat 1 to swing with the rotating shaft 62 as an axis.

Specifically, a push-lift detection device 64 is also provided for detecting the lift operation during the swing process of the connecting seat 1. The push-lift detection device 64 includes a magnet device sleeved on the pushing shaft 61 and a detecting plate fixed on the moving frame 50. The magnet device includes a magnet bracket and a magnet mounted on the magnet bracket. The magnet bracket is fixed on the pushing shaft 61 through a threaded member. The magnet and the detecting plate are located on the same plane. In this way, when the pushing shaft 61 rotates, and when the pushing gear 611 rotates to the lowest point or the highest point of the arc-shaped rack 10, the information can be obtained by the push-lift detection device 64 and the information can be transmitted to the pushing motor 601 so that the pushing motor 601 reverses.

Specifically, a push-count detection device 65 is also provided for counting the how many times the pushing motor 601 reverses, and the push-count detection device 65 is mounted on the third housing.

Specifically, the fourth driving assembly 51 includes a moving motor 511 and a fourth decelerator 512 mounted on the moving frame 50, and moving shafts 52 mounted on both sides of the moving frame 50, and moving gears 521 mounted on both ends of the moving shaft 52. The moving frame 50 is a frame structure, the connecting seat 1 is swingably mounted on the moving frame 50, and the moving motor 511 uses a fourth decelerator 512 to decelerate and drive the moving shaft 52, so that the moving frame 50 can move through the moving gear 521.

The structure of the fourth decelerator 512 may be any one of the first decelerator 312, the second decelerator 422, and the third decelerator 602.

A massage armchair includes a seat part, a backrest part connected to the seat part, and a support part for supporting the seat part, and the backrest part is mounted with the above-mentioned massage mechanism.

The embodiment of the disclosure operates as follows.

During the massage process, if necessary, the moving motor 511 can be in working state, and the moving motor 511 will drive the moving frame 50 to move, so that the upper massage rolling wheel 211 and the lower massage rolling wheel 221 follow the moving motion to adjust the massage position.

If necessary, the pushing motor 601 can also be in working state. The pushing motor 601 will drive the gear 611 to mesh and drive with the arc-shaped rack 10, so that the connecting seat 1, the upper massage rolling wheel 211 and the lower massage rolling wheel 221 reciprocate in an up-down direction with a circular motion trajectory, thereby adjusting the massage strength of the upper massage rolling wheel 211 and the lower massage rolling wheel 221.

If necessary, the percussion motor 421 can also be in working state. The percussion motor 421 drives the percussion shaft 40 to rotate, so that the upper massage rolling wheel 211 and the lower massage rolling wheel 221 perform percussion actions in the front-rear direction through the ball joint rod 413.

If necessary, the kneading motor 311 can also be in working state. The kneading motor 311 rotates through the kneading shaft 32 to drive the first connecting member 29 and the connecting shaft 23 to reciprocate on the supporting seat assembly 20, so that the upper massage arm 21 and the lower massage arms 22 move close to or far away from each other and the upper massage rolling wheel 211 and the lower massage rolling wheel 221 move close to or far away from each other to realize the shoulder-clamping action. In the meantime, the two upper massage arms 21 and the upper massage rolling wheel 211 are simultaneously driven to move close to or away from each other, and the two lower massage arms 22 and the lower massage rolling wheel 221 are driven to move close to or away from each other to realize the kneading action.

In the description of this specification, descriptions with reference to the terms "one embodiment", "some embodiments", "examples", "specific examples", or "some examples" etc. mean that specific features, structures, materials or characteristics described in combination with the embodiment or example are included in at least one embodiment or example of the disclosure. In this specification, the schematic expression of the above-mentioned terms do not necessarily refer to the same embodiment or example. Moreover, the described specific features, structures, materials or characteristics can be combined in any one or more embodiments or examples in a suitable manner.

Although the embodiments of the present disclosure have been shown and described above, it can be understood that the above embodiments are exemplary and should not be construed as limiting the present disclosure. Those of ordinary skill in the art can make changes, amendments, replacement and modifications to the above-mentioned embodiments within the scope of the present disclosure without departing from the principle and purpose of the present disclosure. Any modification, equivalent replacement, improvement, etc. made within the spirit and principle of the present disclosure should fall within the scope to be protected by the present disclosure.

What is claimed is:

1. A massage mechanism, comprising a connecting seat, and two supporting seat assemblies respectively mounted on left and right sides of the connecting seat, two upper massage arms, and two lower massage arms, one of the upper massage arms and one of the lower massage arms are mounted on each supporting seat assembly, the massage mechanism further comprising:

connecting shafts, each connecting shaft being movable on a respective one of the supporting seat assemblies, wherein a bottom end of each upper massage arm is rotatably connected to the connecting shaft, a bottom end of each lower massage arm is rotatably connected to the connecting shaft;

first connecting members, wherein an upper end of each first connecting member is sleeved on a respective one of the connecting shafts;

a kneading shaft, mounted on the connecting seat and connected to the two supporting seat assemblies on the left and right sides of the connecting seat, wherein the kneading shaft is connected to the first connecting members, a rotation axis of the kneading shaft and each supporting seat assembly form a first inclined angle, and the rotation axis of the kneading shaft and each first connecting member form a second inclined angle, the first inclined angle and the second inclined angle are equal in value; and a first driving assembly, configured to drive the kneading shaft to rotate so as to drive the first connecting members and the connecting shafts to reciprocate up and down on each supporting seat assembly, so that the upper massage arm rotates relative to each supporting seat assembly with an axis that perpendicularly passes through each supporting seat assembly as a rotation axis, and the lower massage arm rotates relative to each supporting seat assembly with the axis that perpendicularly passes through each supporting seat assembly as the rotation axis, so that an upper massage rolling wheel on each upper massage arm and a lower massage rolling wheel on each lower massage arm move close to or away from each other to realize a shoulder-clamping action; the two upper massage arms and the upper massage rolling wheels on the two supporting seat assemblies are simultaneously driven to move close to or away from each other, and the two lower massage arms and the lower massage rolling wheels on the two supporting seat assemblies are driven to move close to or away from each other to realize a kneading action.

2. The massage mechanism according to claim 1, wherein the kneading shaft comprises a left section, a middle section, and a right section, a first sleeve and a second sleeve that are integrally formed or separated from each other are sleeved on each of the left section and the right section, the first sleeve and the second sleeve have different axes, the supporting seat assemblies are respectively sleeved on the first sleeves, the first connecting members are respectively sleeved on the second sleeves, the first driving assembly drives the kneading shaft to rotate to complete the shoulder-clamping action and the kneading action simultaneously.

3. The massage mechanism according to claim 2, wherein each first sleeve is provided with a fifth mounting hole, an axis of the fifth mounting hole and an axis of the first sleeve form an inclined angle, each second sleeve is provided with a sixth mounting hole, an axis of the sixth mounting hole and an axis of the second sleeve form an inclined angle.

4. The massage mechanism according to claim 2, wherein an axis of the left section of the kneading shaft and an axis of the middle section of the kneading shaft form an inclined angle, an axis of the right section of the kneading shaft and the axis of the middle section of the kneading shaft form an inclined angle.

5. The massage mechanism according to claim 2, further comprising first bearings and second bearings, wherein the first bearings are respectively sleeved on the first sleeves, and each supporting seat assembly is connected to a respective one of the first sleeves through a respective one of the first bearings, the second bearings are respectively sleeved on the second sleeves, and each first connecting member is connected to a respective one of the second sleeves through a respective one of the second bearings.

6. The massage mechanism according to claim 2, wherein a third sleeve and a fourth sleeve are further sleeved on each of the left section and the right section, diameters of the left section and the right section of the kneading shaft are smaller than a diameter of the middle section of the kneading shaft, shaft ends of the left section and the right section of the kneading shaft are threadedly connected with a first threaded member, one end surface of each third sleeve is close to the middle section of the kneading shaft and the other end surface of each third sleeve is close to an inner ring of a first bearing, one end surface of each fourth sleeve is close to the first threaded member and the other end surface of each fourth sleeve is close to an inner ring of a second bearing.

7. The massage mechanism according to claim 6, wherein a third flange is provided on each third sleeve, a fourth flange is provided on each fourth sleeve, a fifth flange is provided on each first sleeve, and a sixth flange is provided on each second sleeve, the fifth flange is close to the sixth flange, the first bearing is sleeved on each first sleeve and two side end surfaces of the first bearing are close to the third flange and the fifth flange, respectively, each supporting seat assembly is connected to a respective one of the first sleeves through the first bearing, the second bearing is sleeved on each second sleeve and two side end surfaces of the second bearing are close to the fourth flange and the sixth flange, respectively, and each first connecting member is connected to a respective one of the second sleeves through the second bearing.

8. The massage mechanism according to claim 1, wherein each supporting seat assembly comprises a first plate and a second plate that are fixedly connected, the bottom end of the upper massage arm and the bottom end of the lower massage arm are located between the first plate and the second plate, the connecting shaft passes through the first plate and/or the second plate, each of the first plate and the second plate is provided with a position-limiting elongated hole for a movement of the connecting shaft, the first driving assembly is configured to drive each connecting shaft to reciprocate up and down in the position-limiting elongated hole, such that each upper massage arm rotates with respect to each supporting seat assembly with an axis perpendicularly passing through the first plate or the second plate as a rotation axis, and each lower massage arm rotate with respect to each supporting seat assembly with the axis perpendicularly passing through the first plate or the second plate as the rotation axis.

9. The massage mechanism according to claim 8, wherein at least one first rotating connecting member and at least one second rotating connecting member are provided on the first plate or the second plate, the first rotating connecting member is sleeved on the second rotating connecting member, the upper massage arm is connected to the first rotating connecting member or the second rotating connecting member, and the upper massage arm is rotatable relative to the first rotating connecting member and/or the second rotating connecting member;

at least one third rotating connecting member and at least one fourth rotating connecting member are provided on the first plate or the second plate, the third rotating connecting member is sleeved on the fourth rotating connecting member, and the lower massage arm is connected to the third rotating connecting member or the fourth rotating connecting member, the lower massage arm is rotatable relative to the third rotating connecting member and/or the fourth rotating connecting member.

10. The massage mechanism according to claim 1, further comprising:

a percussion shaft, arranged on the connecting seat, wherein the percussion shaft is arranged parallel to the kneading shaft;

percussion assemblies, each of which having one end connected to one of the supporting seat assemblies and the other end sleeved on the percussion shaft; and a second driving assembly, configured to drive the percussion shaft to rotate to drive the percussion assemblies to perform a reciprocating motion, so that the upper massage arms and the lower massage arms swing back and forth to realize a percussion action.

11. The massage mechanism according to claim 10, wherein the percussion shaft comprises a left section, a middle section, and a right section, the left section of the percussion shaft and the middle section of the percussion shaft have different axes, the right section of the percussion shaft and the middle section of the percussion shaft have different axes, the second driving assembly drives the middle section of the percussion shaft to rotate to drive the percussion assemblies to reciprocate, so that the upper massage arms and the lower massage arms swing back and forth to complete the percussion action.

12. The massage mechanism according to claim 10, wherein each percussion assembly comprises a fifth bearing, a first bearing seat and a ball joint rod, the fifth bearing is sleeved on each of a left section and a right section of the percussion shaft, the first bearing seat is sleeved on each fifth bearing, one end of the ball joint rod is hinged with the first bearing seat, and the other end of the ball joint rod is movably connected to a respective one of the supporting seat assemblies, the second driving assembly drives a middle section of the percussion shaft to rotate to drive the ball joint rod of each percussion assembly to reciprocate, so that the upper massage arms and the lower massage arms swing back and forth to complete the percussion action.

13. A massage armchair, comprising the massage mechanism claimed in claim 1.

14. A massage method of the massage armchair according to claim 13, wherein the massage method comprising performing shoulder-clamping massage while performing kneading massage;

wherein the kneading massage refers to an action that the two upper massage rolling wheels distributed left and right and the two lower massage rolling wheels distributed left and right move close to or away from each other while swinging;

the shoulder-clamping massage refers to an action that one of the upper massage rolling wheels and a respective one of the lower massage rolling wheels distributed front and back move close to or away from each other.

15. The massage method according to claim 14, wherein a process of the kneading massage is: the first driving assembly drives the kneading shaft to rotate;

two first sleeves respectively sleeved on a left end and a right end of the kneading shaft rotate;

two first bearings respectively sleeved on outer rings of the two first sleeves perform eccentric rotation with swing;

the two supporting seat assemblies respectively sleeved on outer rings of the two first bearings move close to or away from each other while swinging;

the two upper massage arms respectively arranged on the two supporting seat assemblies move close to or away from each other while swinging;

the two lower massage arms respectively arranged on the two supporting seat assemblies move close to or away from each other while swinging;

the two upper massage rolling wheels respectively arranged on the two upper massage arms move close to or away from each other while swinging;

the two lower massage rolling wheels respectively arranged on the two lower massage arms move close to or away from each other while swinging.

16. The massage method according to claim 15, wherein a process of the shoulder-clamping massage is: the first driving assembly drives the kneading shaft to rotate;

two second sleeves respectively sleeved on a left end and a right end of the kneading shaft rotate;

second bearing sleeved on an outer ring of each second sleeve (34) performs eccentric rotation with swing;

the first connecting member sleeved on an outer ring of the second bearing reciprocates up and down;

the connecting shaft connected to the first connecting member reciprocates up and down;

the upper massage arm and the lower massage arm rotatably connected to the connecting shaft move close to or away from each other during rotation;

each upper massage rolling wheels and a respective one of the lower massage rolling wheels complete the action of moving close to or away from each other once.

17. The massage method according to claim 16, wherein the first bearing is sleeved on a first outer side wall of each first sleeve, the second bearing is sleeved on a second outer side wall of each second sleeve, an axis of the second outer side wall is located right below an axis of the first outer side wall, the first driving assembly drives the kneading shaft to rotate half a turn, when the two upper massage rolling wheels move to change a distance therebetween from a largest separation distance to a smallest separation distance and the two lower massage rolling wheels move to change a distance therebetween from a largest separation distance to a smallest separation distance, each upper massage rolling wheel and a respective one of the lower massage rolling wheels move to change a distance therebetween from a smallest separation distance to a largest separation distance.

18. The massage method according to claim 16, wherein the first bearing is sleeved on a first outer side wall of each first sleeve, the second bearing is sleeved on a second outer side wall of each second sleeve, an axis of the second outer side wall is located right above an axis of the first outer side wall, the first driving assembly drives the kneading shaft to rotate half a turn, when the two upper massage rolling wheels move to change a distance therebetween from a largest separation distance to a smallest separation distance and the two lower massage rolling wheels move to change a distance therebetween from a largest separation distance to a smallest separation distance, each upper massage rolling wheel and a respective one of the lower massage rolling wheels move to change a distance therebetween from the largest separation distance to the smallest separation distance.

19. The massage method according to claim 16, wherein the first bearing is sleeved on a first outer side wall of each first sleeve, the second bearing is sleeved on a second outer side wall of each second sleeve, an axis of the second outer side wall and an axis of the first outer side wall are not on a same vertical plane, the first driving assembly drives the kneading shaft to rotate half a turn, when the two upper massage rolling wheels move to change a distance therebetween from a largest separation distance to a smallest separation distance and the two lower massage rolling wheels move to change a distance therebetween from a largest separation distance to a smallest separation distance, each upper massage rolling wheel and a respective one of the lower massage rolling wheels are in a process of moving to change a distance therebetween from a largest separation distance to a smallest separation distance or moving to change the distance therebetween from the smallest separation distance to the largest separation distance.

20. The massage method according to claim 16, wherein each first sleeve and a respective one of the second sleeves are integrally formed or fixedly connected, the first driving assembly comprises a kneading motor and a first decelerator, and the kneading motor decelerates and drives the kneading shaft to rotate through the first decelerator.

* * * * *